United States Patent
Tobita et al.

(10) Patent No.: US 11,175,748 B2
(45) Date of Patent: Nov. 16, 2021

(54) LEARNING SUPPORT SYSTEM

(71) Applicant: Wacom Co., Ltd., Saitama (JP)

(72) Inventors: Tatsunosuke Tobita, Saitama (JP); Toshihiko Horie, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/069,710

(22) Filed: Oct. 13, 2020

(65) Prior Publication Data
US 2021/0026463 A1  Jan. 28, 2021

Related U.S. Application Data

(63) Continuation of application No. PCT/JP2019/006434, filed on Feb. 21, 2019.

(30) Foreign Application Priority Data

May 14, 2018 (JP) .............................. JP2018-092688

(51) Int. Cl.
*G06F 3/03* (2006.01)
*G06F 3/041* (2006.01)
(Continued)

(52) U.S. Cl.
CPC ........ *G06F 3/0317* (2013.01); *G06F 3/03545* (2013.01); *G06F 3/04162* (2019.05); *G06F 3/04883* (2013.01)

(58) Field of Classification Search
CPC .. G06F 3/03545; G06F 3/04883; G06F 3/044; G06F 2203/04106; G06F 3/0383;
(Continued)

(56) References Cited

U.S. PATENT DOCUMENTS

| 7,068,860 B2 * | 6/2006 | Kasabach | ........... G06F 3/03545 |
| | | | 382/314 |
| 7,268,774 B2 * | 9/2007 | Pittel | ..................... G06F 3/0386 |
| | | | 345/179 |

(Continued)

FOREIGN PATENT DOCUMENTS

| JP | 2-73292 A | 3/1990 |
| JP | 9-325849 A | 12/1997 |

(Continued)

OTHER PUBLICATIONS

International Search Report, dated May 14, 2019, for International Application No. PCT/JP2019/006434, 2 pages.

*Primary Examiner* — Koosha Sharifi-Tafreshi
(74) *Attorney, Agent, or Firm* — Seed IP Law Group LLP

(57) ABSTRACT

A learning support system includes: an electronic pen, a writing medium position instruction tool, a position detection apparatus, and a display apparatus. The electronic pen is capable of recording handwriting and transmitting a position instruction signal. The position detection apparatus determines a position of a note provided with the writing medium position instruction tool on a position detection sensor based on a placement position instruction signal from the writing medium position instruction tool, converts coordinates of coordinate information corresponding to handwriting recorded on the note by the electronic pen, and displays an image corresponding to the handwriting recorded on the note on a display terminal and a teacher terminal in a mode recorded on the note. The learning support system enables an educator to determine a situation of a learner to contribute to an increase effectiveness of learning.

16 Claims, 10 Drawing Sheets

(51) Int. Cl.
*G06F 3/0354* (2013.01)
*G06F 3/0488* (2013.01)

(58) Field of Classification Search
CPC ...... G06F 3/0412; G06F 3/0442; G06F 3/041;
G06F 3/0317; G06F 3/04162; G06F
3/046; G06K 9/222; G09B 5/12
See application file for complete search history.

(56) References Cited

U.S. PATENT DOCUMENTS

| | | | | |
|---|---|---|---|---|
| 2002/0074171 | A1* | 6/2002 | Nakano | ............... G06F 3/03545 178/18.01 |
| 2002/0163511 | A1* | 11/2002 | Sekendur | ............ G06F 3/03545 345/179 |
| 2016/0099983 | A1 | 4/2016 | Han et al. | |

FOREIGN PATENT DOCUMENTS

| | | | |
|---|---|---|---|
| JP | 2015-102556 A | 6/2015 | |
| JP | 2017-37354 A | 2/2017 | |
| JP | 2017-535851 A | 11/2017 | |
| JP | 2018-49413 A | 3/2018 | |

* cited by examiner

FIG.7A
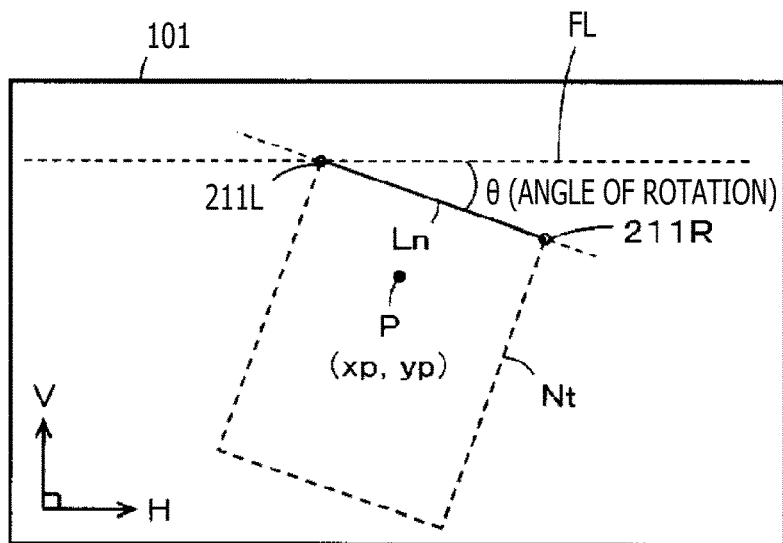
⬇
FIG.7B
$$\begin{bmatrix} xtp \\ ytp \\ 1 \end{bmatrix} = \begin{bmatrix} \cos\theta & -\sin\theta & 0 \\ \sin\theta & \cos\theta & 0 \\ 0 & 0 & 1 \end{bmatrix} \begin{bmatrix} xp \\ yp \\ 1 \end{bmatrix}$$
FIG.7C
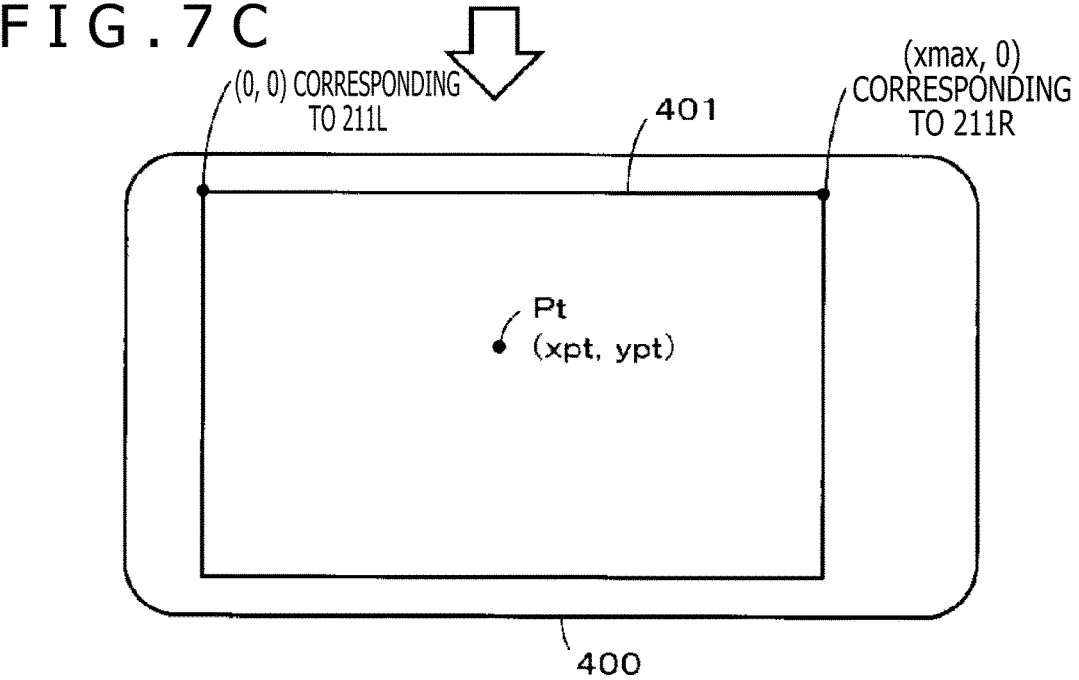

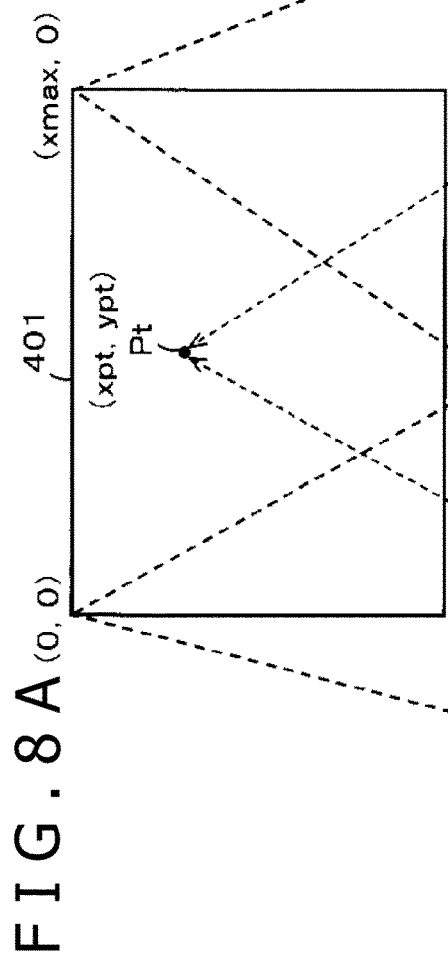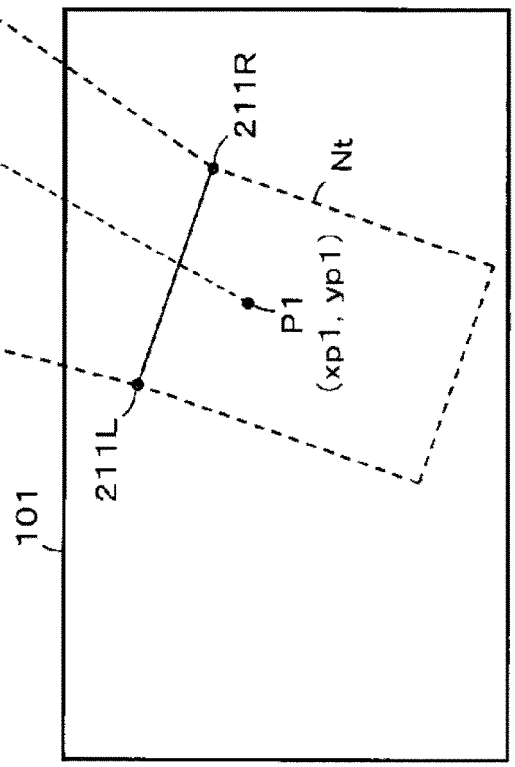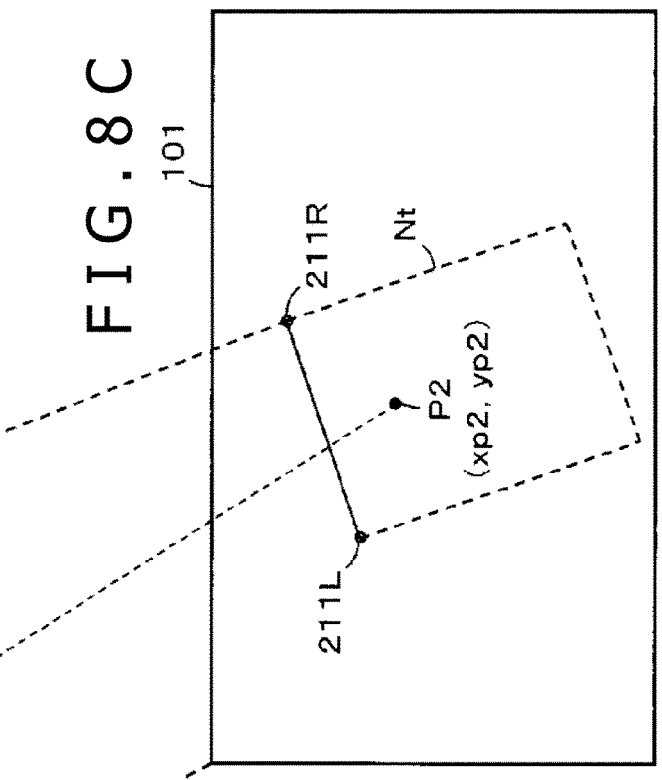

LEARNING SUPPORT SYSTEM

BACKGROUND

Technical Field

The present disclosure relates to a system for supporting learning in, for example, elementary schools, junior high schools, high schools, colleges, tutoring schools, preparatory schools, various vocational schools, and various other seminars.

Background Art

In the past, there has been a demand for appropriately figuring out, in a class, the progress and the like of each student taking the class in the site of school education. In general, it is difficult for one teacher to appropriately figure out the progress and the like of each of tens of students taking the class. Therefore, each one of the students and the teacher can be connected through a terminal apparatus, such as a personal computer, to hold a lesson in an environment that allows to transmit and receive information in real time.

Specifically, a personal computer is provided to each one of the students, and the student inputs an answer to a problem or a question to the personal computer. The information input to the personal computer by the student is transmitted to a personal computer for teacher. This allows the teacher to figure out, in real time, the progress in making an answer to a problem or a question, whether or not the answer is right, and the state of understanding of each one of the students through the personal computer for teacher.

More specifically, an invention is disclosed in Japanese Patent Laid-Open No. 2015-102556 regarding a learning support program and a learning support apparatus that use an electronic device, such as a personal computer, a smartphone, and a tablet computer, including a pen input panel to answer a question. Here, the pen input panel is an electronic part including a combination of a display apparatus and what is generally called a touch sensor, and the examinee can use the electronic pen to write and input a formula or a sentence. This allows the student or the like to input an answer to the electronic device in the sense of recording the answer in a note, and the teacher can check the answer in real time.

However, although a keyboard and what is generally called a mouse are used to operate the personal computer, the input may be difficult if the student is not familiar with the operation. On the other hand, the input operation is simple in the electronic device including the pen input panel. However, the electronic pen may be slippery on the pen input panel, or the input screen may be small. Therefore, the input may be difficult in some cases. In addition, a plurality of items may need to be selected from the operation menu before the screen for inputting the answer is displayed, and this may be cumbersome.

Furthermore, the degree of freedom, such as taking a note of a thinking process or carrying out a calculation on the surface of a note, may be insufficient in the case of using the electronic device including the pen input panel. Therefore, deliberations and considerations with a wide perspective may be difficult even in the case of using the electronic device including the pen input panel, and the desired effect of education may not be sufficiently obtained. Particularly, the student may be distracted by the operation of the personal computer in elementary education, and the objective of supporting the inherent creativity to derive a flexible answer may not be sufficiently attained.

Therefore, familiar notes in different formats on the basis of subjects and familiar writing tools need to be used on a relatively wide desk of a classroom to allow appropriately figuring out the learning status of each one of the students who are thinking flexibly while demonstrating creativity. This is also important in the sites of education other than the elementary education.

BRIEF SUMMARY

In view of the above, an object is to allow appropriately figuring out the learning status of a learner, such as a school child, to contribute to an increase in a learning effect without significantly changing the conventional learning environment and without placing a large load on the learner, such as a student.

To solve the above problem, provided is a learning support system including an electronic pen, a writing medium position instruction tool, a position detection apparatus, and a display apparatus. The electronic pen includes a handwriting formation circuit which, in operation, leaves handwriting in a writing medium, and a position instruction signal transmission circuit which, in operation, transmits a position instruction signal to the position detection apparatus. The writing medium position instruction tool includes a placement position instruction signal transmission unit configured to be attached to the writing medium and which, in operation, transmits, to the position detection apparatus, a placement position instruction signal that instructs a placement position of the writing medium. The position detection apparatus includes a position detection sensor including a plurality of electrodes in a first direction and in a second direction intersecting the first direction, a placement position detection circuit which, in operation, detects the placement position of the writing medium based on output from the position detection sensor corresponding to the placement position instruction signal when the writing medium provided with the writing medium position instruction tool is placed on the position detection sensor, an instruction position detection circuit which, in operation, detects an instruction position of the electronic pen based on the output from the position detection sensor corresponding to the position instruction signal when the electronic pen performs recording in the writing medium placed on the position detection sensor, a coordinate conversion circuit which, in operation, converts the instruction position of the electronic pen detected by the instruction position detection circuit unit into coordinate information to be displayed on a display device of the display apparatus based on the placement position of the writing medium detected by the placement position detection circuit, and a first transmission circuit which, in operation, transmits the coordinate information converted by the coordinate conversion circuit to the display apparatus, the display apparatus including a first reception circuit which, in operation, receives the coordinate information from the position detection apparatus, and a display control unit that displays the handwriting of the electronic pen on the display device based on the coordinate information received through the first reception circuit.

According to the learning support system, the electronic pen includes the handwriting formation unit. Therefore, the electronic pen can leave the handwriting in the writing medium, such as a note and a piece of paper, and transmit the position instruction signal through the position instruction signal transmission circuit. The writing medium position instruction tool is attached to the writing medium, such as a note and a piece of paper, and the writing medium position instruction tool can transmit the placement position instruction signal through the placement position instruction signal transmission circuit. The position detection apparatus includes the position detection sensor, and the placement position detection circuit detects the placement position of the writing medium based on the placement position instruction signal from the writing medium position instruction tool placed on the position detection sensor. The instruction position detection circuit detects the instruction position corresponding to the handwriting of the electronic pen based on the position instruction signal from the electronic pen used for the writing on the writing medium placed on the position detection sensor.

In the position detection apparatus, the coordinate conversion circuit converts the instruction position of the electronic pen detected by the instruction position detection circuit into the coordinate information to be displayed on the display device of the display apparatus based on the placement position of the writing medium detected by the placement position detection circuit. The converted coordinate information is transmitted from the position detection apparatus to the display apparatus through the first transmission circuit. The display apparatus receives the coordinate information from the position detection apparatus through the first reception circuit, and the display control circuit causes the display device to display the image corresponding to the handwriting of the electronic pen based on the received coordinate information.

In this way, even if, for example, the writing medium, such as a note and a piece of paper, provided with the writing medium position instruction tool is obliquely placed on the position detection sensor, the image corresponding to the handwriting recorded on the writing medium can be appropriately displayed on the display device of the display apparatus. Therefore, the handwriting recorded on the writing medium can be appropriately displayed on the display device of the display apparatus, and the handwriting can be viewed and saved.

BRIEF DESCRIPTION OF THE DRAWINGS

FIGS. 7A, 7B, and 7C illustrates diagrams for describing a process of converting coordinates of handwriting recorded in a writing medium placed on a position detection sensor into coordinates on a display device of a display apparatus;

FIGS. 8A, 8B, and 8C illustrate diagrams for describing a specific example of converting coordinates instructed to the writing medium placed on the position detection sensor into coordinates on the display device of the display apparatus;

DETAILED DESCRIPTION

An embodiment of a learning support system according to the disclosure will now be described with reference to the drawings. The learning support system of the disclosure can be widely used in, for example, elementary schools, junior high schools, high schools, colleges, tutoring schools, preparatory schools, various vocational schools, and various other seminars. However, an example of using the learning support system of the disclosure in classrooms of lower grades of elementary schools will be described to simplify the description.

Configuration Example and Usage Mode of Learning Support System

<Configuration Example of Learning Support System>

Figure 1A:
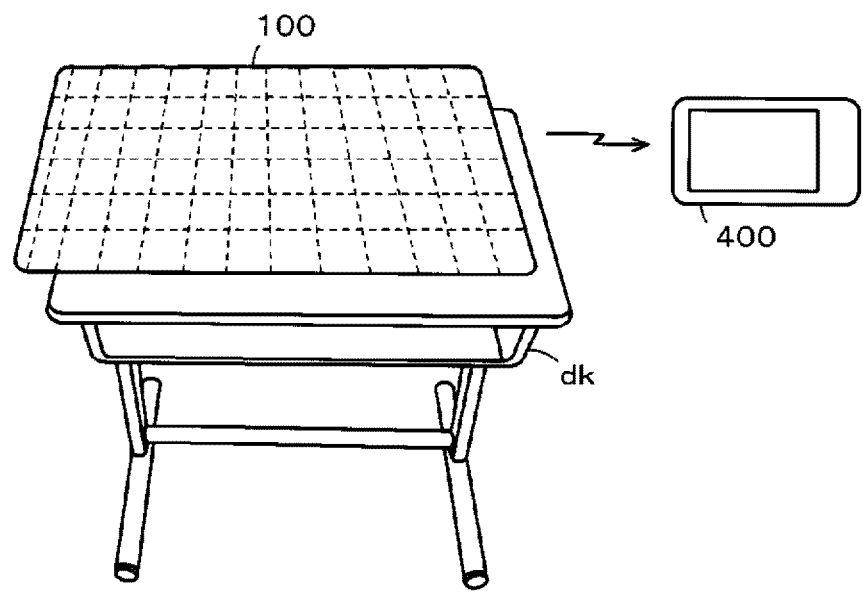
FIGS. 1A, 1B, and 1C illustrate diagrams for describing a configuration example of a learning support system according to an embodiment of the present disclosure.
Figure 1B:
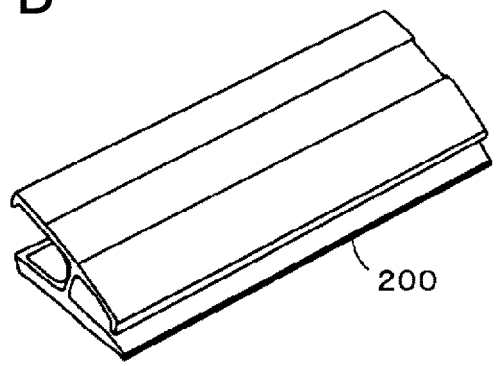
Figure 1C:
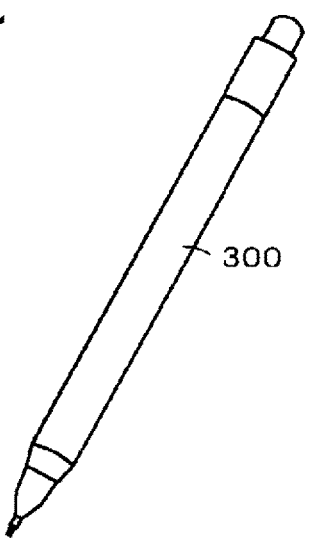

FIGS. 1A, 1, and 1C illustrate diagrams for describing a configuration example of the learning support system of the embodiment. The learning support system of the embodiment includes a position detection apparatus 100, a paper clip 200, an electronic pen 300, and display apparatuses. The display apparatuses include a display terminal 400 used by each one of school children as also illustrated in FIG. 1A and a teacher terminal 500 described later used by a teacher.

The position detection apparatus 100 includes a position detection sensor and has, for example, a short-range wireless communication function of Bluetooth (registered trademark) standard or a wireless communication function of Wi-Fi (registered trademark) standard. The position detection sensor of the position detection apparatus 100 is provided on, for example, an upper surface of a top plate of a desk dk used by a school child in a classroom. The position detection apparatus 100 can detect an instruction position or the like of the electronic pen on the position detection sensor and use the short-range wireless communication function or the like to transmit the detected instruction position as coordinate information to the outside.

The paper clip 200 sandwiches and holds, for example, a note that is a writing medium and is placed and used on the position detection sensor of the position detection apparatus 100 provided on the desk dk. The paper clip 200 includes a placement position instruction signal transmission circuit to allow the position detection apparatus 100 to recognize the position of the sandwiched and held writing medium on the position detection sensor. That is, the paper clip 200 has a function of a writing medium position instruction tool.

The electronic pen 300 includes a handwriting formation unit and a position instruction signal transmission circuit. The electronic pen 300 can leave handwriting on a writing medium, such as a note, and use a position instruction signal from the position instruction signal transmission circuit to report the instruction position of the electronic pen 300 to a position detection sensor 101 of the position detection apparatus 100. Examples of the handwriting formation unit of the electronic pen 300 include a mechanical pencil unit and a ballpoint pen unit. In the embodiment, the electronic pen 300 includes a mechanical pencil unit as the handwriting formation unit.

The display terminal 400 is a terminal apparatus including a relatively large display device, such as a high-performance mobile phone terminal called a smartphone or the like and a tablet terminal (tablet PC), possessed by a school child. The display terminal 400 has, for example, a short-range wireless communication function of Bluetooth (registered trademark) standard, and the display terminal 400 can receive coordinate information output through the short-range wireless communication function of the position detection apparatus 100 and display the handwriting corresponding to the coordinate information on the display device. The display terminal 400 can also record the displayed handwriting of the electronic pen 300 in a storage apparatus of the display terminal 400.

<Usage Mode of Learning Support System>

Figure 2:
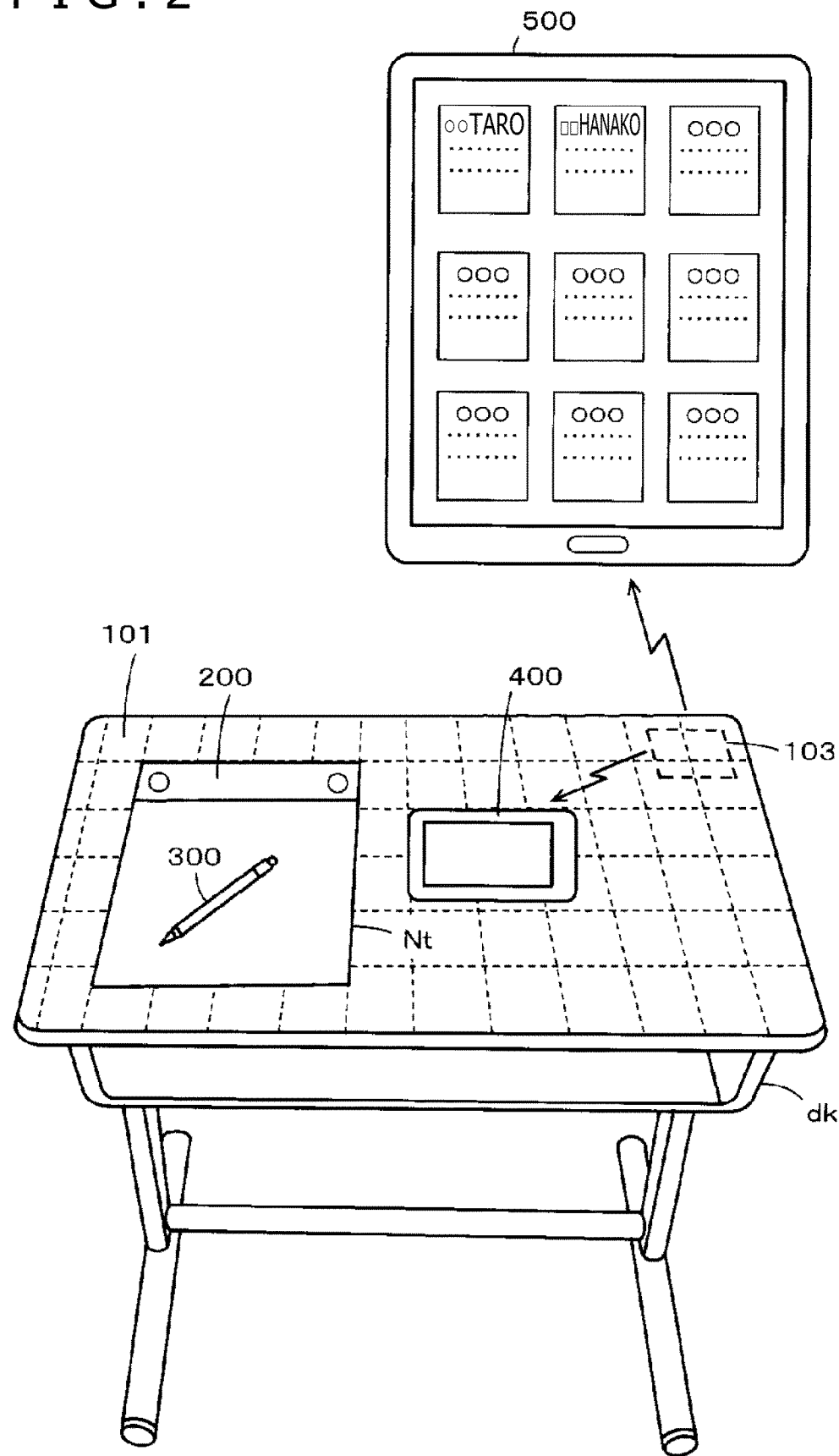
FIG. 2 is a diagram for describing a usage mode of the learning support system according to an embodiment of the present disclosure.

FIG. 2 is a diagram for describing a usage mode of a learning support system of the embodiment. As illustrated in FIG. 2, the position detection sensor 101 of the position detection apparatus 100 is provided on the upper surface of the top plate of the desk dk used by a school child in a classroom so as to cover the entire surface of the upper surface. A wireless communication unit 103 of the position detection apparatus 100 is provided on, for example, the back side of the top plate of the desk dk.

As illustrated in FIG. 2, a note Nt provided with the paper clip 200 is placed on the position detection sensor 101 of the position detection apparatus 100, and the display terminal 400 is also placed and used on the position detection sensor 101. The electronic pen 300 is used to record various types of handwriting, such as characters, symbols, and diagrams, in the note Nt provided with the paper clip 200. In this case, the position instruction signal is transmitted from the electronic pen 300, and the position detection sensor 101 of the position detection apparatus 100 recognizes the position instruction signal and figures out the position instruction signal as the coordinate information. That is, the coordinate information corresponding to the handwriting recorded in the note Nt can be detected through the position detection sensor 101.

However, it is assumed that the note Nt provided with the paper clip 200 is, for example, obliquely placed on the position detection sensor 101. In this case, even if the handwriting is performed appropriately, not obliquely, recorded in the note Nt, it is recognized that the handwriting is obliquely recorded on the position detection sensor 101 because the note Nt is obliquely placed on the position detection sensor 101.

Therefore, the position detection apparatus 100 first specifies the placement position of the note Nt provided with the paper clip 200 on the position detection sensor 101 based on the placement position instruction signal from the placement position instruction signal transmission circuit of the paper clip 200. Based on the placement position of the note Nt, the position detection apparatus 100 converts the coordinate information corresponding to the handwriting on the position detection sensor 101 into coordinate information forming the handwriting in the state written in the note Nt.

The position detection apparatus 100 then transmits the coordinate information after coordinate conversion to the display terminal 400 through the wireless communication unit 103 of the position detection apparatus 100. The display terminal 400 can display an image according to the coordinate information from the position detection apparatus 100 to thereby display the image corresponding to the handwriting written in the note Nt by the electronic pen 300 as written in the note Nt without being obliquely inclined.

In this way, the learning support system of the embodiment can display, on the display device of the display terminal 400, the handwriting as recorded in the note Nt provided with the paper clip 200 regardless of how the note Nt is placed on the position detection sensor 101. Even when the note Nt used for writing is submitted to, for example, the teacher, the review of the note Nt is not obstructed because the content recorded in the note Nt is recorded in the display terminal 400 so that the note Nt can be checked any time.

The coordinate information after coordinate conversion provided from the position detection apparatus 100 to the display terminal 400 is also transmitted to the teacher terminal 500 through the wireless communication unit 103 of the position detection apparatus 100. In this case, the position detection apparatus 100 transmits identification information of the position detection apparatus 100 or identification information of the school child as a user to the teacher terminal 500 along with the coordinate information. The teacher terminal 500 is, for example, an information terminal, such as a tablet computer, used by the teacher, and the teacher terminal 500 receives the coordinate information and the identification information from the position detection apparatuses installed on the desks dk used by a plurality of school children in the classroom. For each school child in the classroom, the teacher terminal 500 displays, in real time, the situation of writing in the note Nt using the electronic pen 300 as illustrated in FIG. 2.

Therefore, the teacher terminal 500 holds, in a predetermined memory, a table associating the identification information from the position detection apparatus 100 used by each school child with each school child. As a result, the image of the handwriting corresponding to the information from the position detection apparatus used by each school child can be displayed and viewed for each school child as illustrated in FIG. 2.

That is, the teacher using the teacher terminal 500 can use the display information of the teacher terminal 500 to figure out the situation of writing in the note Nt of each school child. Therefore, the progress of learning of each school child can be figured out in real time. Note that the size of the display device of the teacher terminal 500 is limited, and the situations of recording in the notes Nt of all of the school children in the classroom may not be displayed. In this case, the display device is scrolled or a new page is formed to allow the teacher to view all of the situations.

Next, a configuration example of each of the position detection apparatus 100, the paper clip 200, the electronic pen 300, the display terminal 400 as a display apparatus, and the teacher terminal 500 included in the learning support system of the embodiment will be described. Note that the display terminal 400 and the teacher terminal 500 have substantially similar functions, and the configuration of the display terminal 400 will be representatively described for the configurations of the display terminal 400 and the teacher terminal 500.

Examples of the system of the position detection apparatus include an electromagnetic induction system (electro magnetic resonance technology (EMR) system), an active capacitive coupling system (active electrostatic (AES) system), and a passive capacitive coupling system. The position detection apparatus of any system can be used in the disclosure to construct the learning support system in the modes described with reference to FIGS. 1 and 2. In the following description, an example of using the position detection apparatus and the electronic pen of the electromagnetic induction system (EMR system) will be described to simplify the description.

[Configuration Examples of Position Detection Apparatus 100 and Electronic Pen 300]

Figure 3:
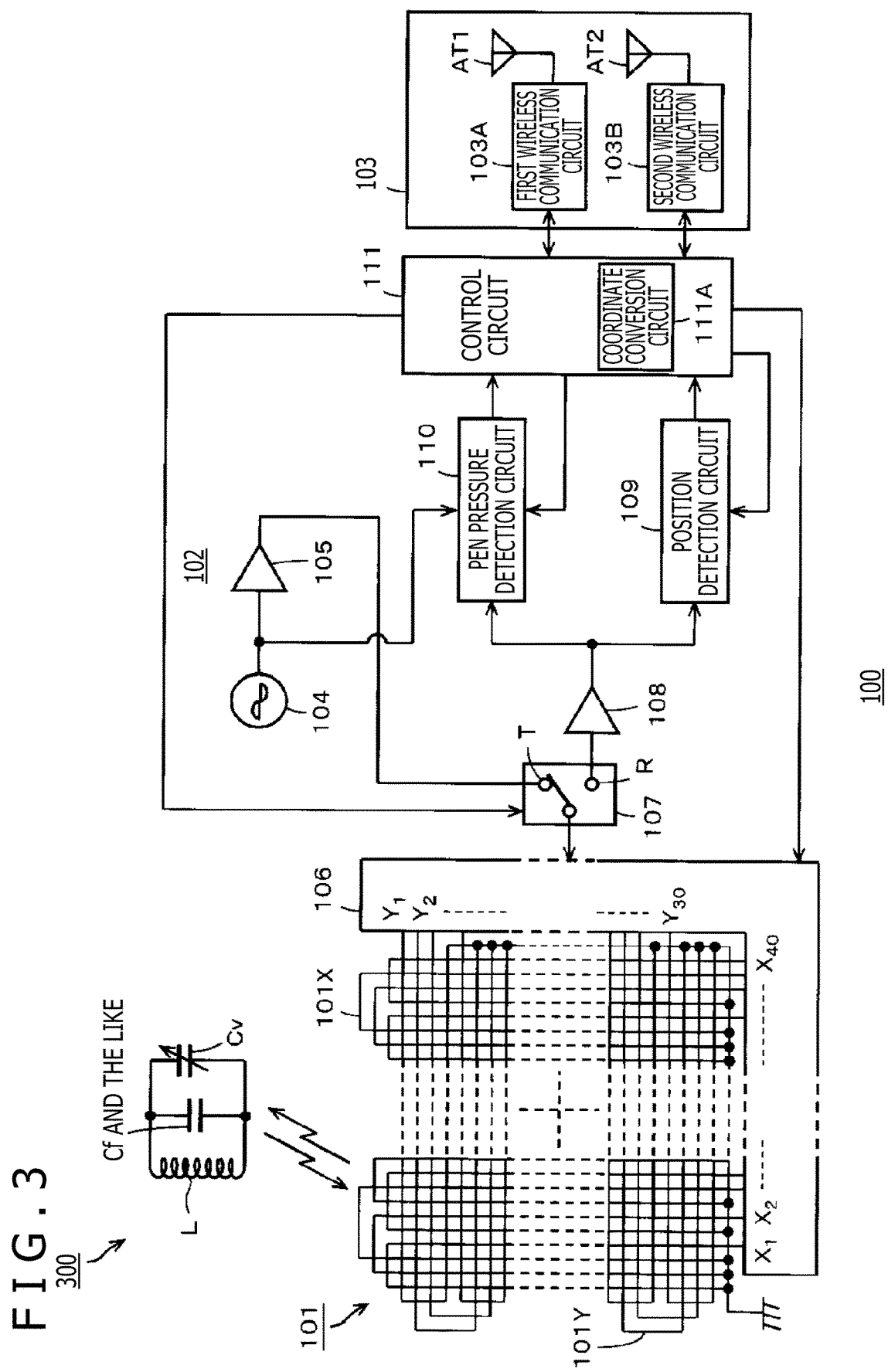
FIG. 3 is a block diagram for describing a configuration example of a position detection apparatus and an electronic pen.

FIG. 3 is a block diagram for describing configuration examples of the position detection apparatus 100 and the electronic pen 300 of the embodiment in which the electromagnetic induction system is applied. A configuration example of the part of the electronic pen 300 excluding the handwriting formation unit is illustrated on the upper left of FIG. 3. That is, the part of the electronic pen 300 realizing the function of the electronic pen includes a resonant circuit including a coil L, a pen pressure detector Cv, and a capacitor Cf that are connected in parallel. The coil L is used for signal transmission and reception, and the pen pressure detector Cv includes a variable capacitor in which the capacitance changes according to the applied pen pressure. The capacitor Cf is a resonant capacitor that provides a resonant circuit along with the coil L. Note that a more specific configuration of the electronic pen 300 will be described later.

The position detection apparatus 100 is roughly divided into the position detection sensor 101, a position detection circuit 102, and the wireless communication circuit 103. The position detection sensor 101 includes an X-axis direction loop coil group 101X and a Y-axis direction loop coil group 101Y stacked on top of each other. The position detection sensor 101 is provided to cover, for example, the upper surface of the top plate of the desk used by the school child in the classroom as described above. Therefore, although only simply illustrated in FIG. 3, four corners of the position detection sensor 101 are curved according to the shape of the upper surface of the top plate of the desk dk as illustrated in FIGS. 1 and 2.

Note that each of loop coils $X_1$ to $X_{40}$ of the X-axis direction loop coil group 101X and loop coils $Y_1$ to $Y_{30}$ of the Y-axis direction loop coil group 101Y included in the electrodes of the position detection sensor 101 may have one turn or may have two or more turns. The numbers of loop coils of the loop coil groups 101X and 101Y can also be appropriately set according to the size of the position detection sensor 101.

The position detection circuit 102 includes an oscillator 104, a current driver 105, a selection circuit 106, a switch connection circuit 107, a reception amplifier 108, a position detection circuit 109, a pen pressure detection circuit 110, and a control circuit 111. The control circuit 111 includes a microprocessor. The control circuit 111 controls selection of a loop coil in the selection circuit 106 and switch of the switch connection circuit 107 and controls process timing in the position detection circuit 109 and the pen pressure detection circuit 110.

The X-axis direction loop coil group 101X and the Y-axis direction loop coil group 101Y of the position detection sensor 101 are connected to the selection circuit 106. The selection circuit 106 sequentially selects each loop coil of the two loop coil groups 101X and 101Y. The oscillator 104 generates an alternate current (AC) signal with a frequency f0. The oscillator 104 supplies the generated AC signal to the current driver 105 and the pen pressure detection circuit 110. The current driver 105 converts the AC signal supplied from the oscillator 104 into current and transmits the current to the switch connection circuit 107.

The switch connection circuit 107 is controlled by the control circuit 111 to switch the connections (transmission side terminal T and reception side terminal R) of the loop coil selected by the selection circuit 106. The current driver 105 is connected to the transmission side terminal T of the connections, and the reception amplifier 108 is connected to the reception side terminal R. The switch connection circuit 107 is switched to the terminal T side to transmit a signal from the position detection sensor 101, and conversely, the switch connection circuit 107 is switched to the terminal R side when the position detection sensor 101 receives a signal from the outside.

The current from the current driver 105 is supplied to the loop coil selected by the selection circuit 106 when the switch connection circuit 107 is switched to the terminal T side. As a result, a magnetic field is generated in the loop coil, and the magnetic field acts on the resonant circuit of the electronic pen 300 and the resonant circuit included in the paper clip 200 facing the loop coil. In this way, the signal (radio wave) can be transmitted.

On the other hand, the induced voltage generated in the loop coil selected by the selection circuit 106 is transmitted to the reception amplifier 108 through the selection circuit 106 and the switch connection circuit 107 when the switch connection circuit 107 is switched to the terminal R side. The reception amplifier 108 amplifies the induced voltage supplied from the loop coil and transmits the induced voltage to the position detection circuit 109 and the pen pressure detection circuit 110.

That is, the radio wave transmitted from the electronic pen 300 generates the induced voltage in each loop coil of the X-axis direction loop coil group 101X and the Y-axis direction loop coil group 101Y. The position detection circuit 109 detects the induced voltage, that is, the reception signal, generated in the loop coil, converts the detected output signal into a digital signal, and outputs the digital signal to the control circuit 111. The control circuit 111 calculates the coordinate values of the instruction position in the X-axis direction and the Y-axis direction of the electronic pen 300 based on the level of the digital signal from the position detection circuit 109, that is, the voltage value of the induced voltage generated in each loop coil.

On the other hand, the pen pressure detection circuit 110 uses the AC signal from the oscillator 104 to perform synchronous detection of the output signal of the reception amplifier 108, obtains a signal of the level corresponding to the phase difference (frequency shift) between the signals, converts the signal corresponding to the phase difference (frequency shift) into a digital signal, and outputs the digital signal to the control circuit 111. The control circuit 111 detects the pen pressure applied to the electronic pen 300 based on the level of the digital signal from the pen pressure detection circuit 110, that is, the signal corresponding to the phase difference (frequency shift) between the transmitted radio wave and the received radio wave.

The position detection sensor 101 and the position detection circuit 102 further receive the placement position instruction signal from the paper clip 200 including the resonant circuit to detect the placement position of the note Nt provided with the paper clip 200 on the position detection sensor 101. That is, the placement position of the paper clip 200 is first specified according to the placement position instruction signal from the paper clip 200. The placement position of the note Nt provided with the paper clip 200 on the position detection sensor 101 is specified from the specified placement position of the paper clip 200. The detection method of the placement position of the paper clip 200 corresponding to the placement position instruction signal is similar to the detection of the instruction position of the electronic pen 300. That is, the position detection circuit 109 also functions as a placement position detection circuit.

The control circuit 111 includes a coordinate conversion circuit 111A as illustrated in FIG. 3. The coordinate conversion circuit 111A converts the coordinates of the coordinate information of the instruction position of the electronic pen 300 on the position detection sensor 101 according to the placement position of the note Nt provided with the paper clip 200 on the position detection sensor 101. In this way, the image corresponding to the handwriting can be displayed on the display device of the display terminal 400 in the mode recorded in the note Nt even when the handwriting is recorded in the note Nt obliquely placed on the position detection sensor 101 as also described above.

The wireless communication unit 103 including a first wireless communication circuit 103A and a second wireless communication circuit 103B is further connected to the control circuit 111. An antenna AT1 is connected to the first wireless communication circuit 103A, and an antenna AT2 is connected to the second wireless communication circuit 103B so that signals can be transmitted and received. The first wireless communication circuit 103A is a part that uses, for example, a communication system of Bluetooth (registered trademark) standard to perform wireless communication. The second wireless communication circuit 103B is a part that uses, for example, a wireless communication system of Wi-Fi (registered trademark) standard to perform wireless communication. The control circuit 111 also has a function of controlling the wireless communication unit 103 including the first wireless communication circuit 103A and the second wireless communication circuit 103B.

The position detection apparatus 100 can also wirelessly communicate with both the display terminal 400 and the teacher terminal 500 through the first wireless communication circuit 103A or through the second wireless communication circuit 103B. Obviously, it is also possible to perform wireless communication with the display terminal 400 on the desk dk through the first wireless communication circuit 103A and perform wireless communication with the teacher terminal 500 through the second wireless communication circuit 103B. That is, different wireless communication circuits can be used for the display terminal 400 and the teacher terminal 500 according to, for example, the communication range of the wireless communication.

In this way, the position detection apparatus 100 of the embodiment specifies the placement position of the note Nt provided with the paper clip 200 on the position detection sensor 101 from the position of the paper clip 200 on the position detection sensor 101. When the electronic pen 300 is used to record handwriting in the note Nt placed on the position detection sensor 101, the position detection apparatus 100 takes into account the placement position of the note Nt to convert the coordinate information indicating the instruction position of the electronic pen 300 into coordinate information that can be appropriately displayed on the display device of the display terminal 400. The position detection apparatus 100 can wirelessly transmit the coordinate information converted in this way to the display terminal 400 and the teacher terminal 500.

[Configuration Example of Writing Medium Position Instruction Tool]

Figure 4A:
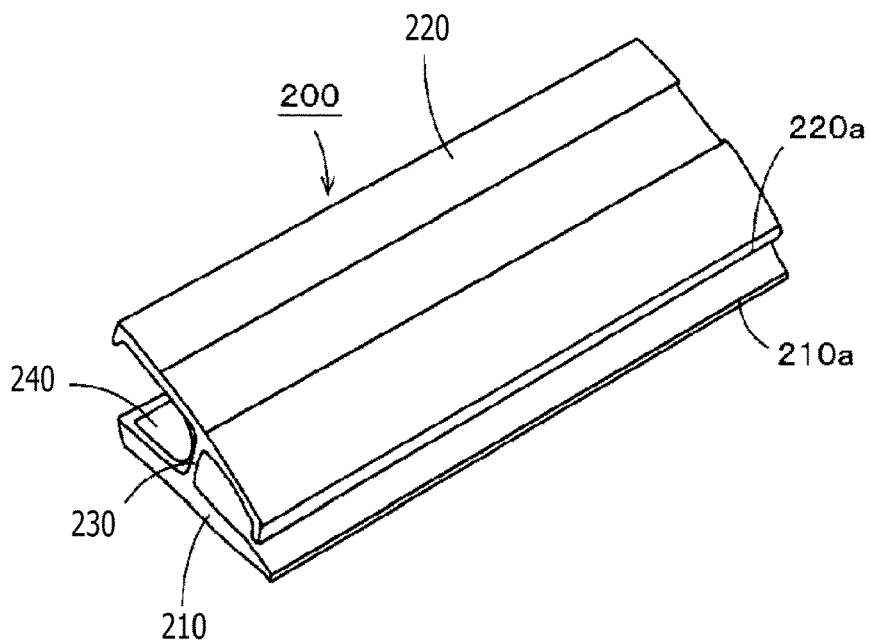
FIGS. 4A, 4B, and 4C illustrate diagrams for describing a configuration example of a paper clip as a writing medium position instruction tool.
Figure 4B:
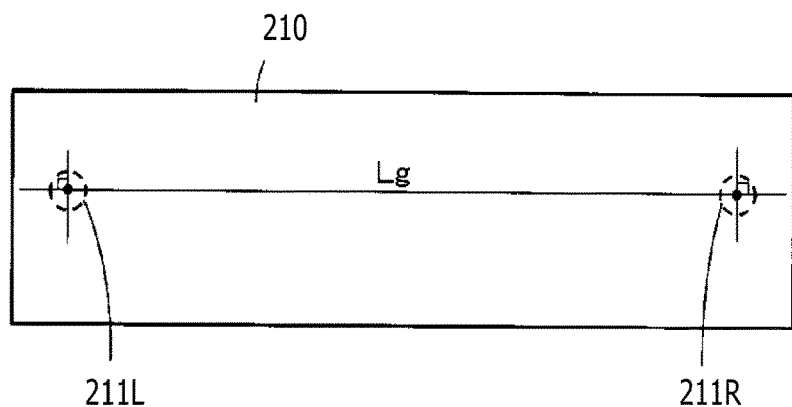
Figure 4C:
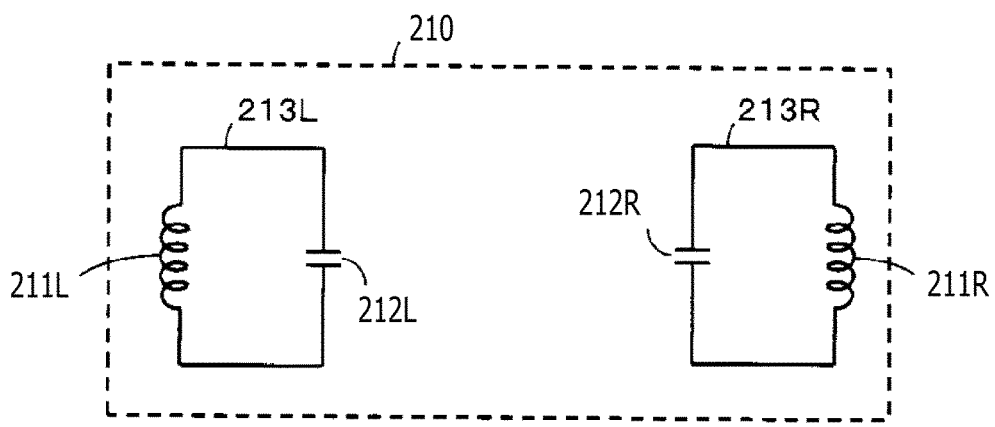

FIGS. 4A, 4B, and 4C illustrate diagrams for describing a configuration example of the paper clip 200 as a writing medium position instruction tool. FIG. 4A is an external view of the paper clip 200. As illustrated in FIG. 4A, the paper clip 200 includes a lower clipping piece 210 and an upper clipping piece 220 connected through a connection portion 230 to prevent separation. End portions of the lower clipping piece 210 and the upper clipping piece 220 in the direction intersecting in the longer direction can move up and down about the connection portion 230 like a seesaw.

A leaf spring 240 is mounted in a U-shape on the back side of the connection portion 230, and the leaf spring 240 biases the lower clipping piece 210 and the upper clipping piece 220 in opposite directions on the back side of the connection portion 230. In this way, force is applied so that a front end portion 210a of the lower clipping piece 210 and a front end portion 220a of the upper clipping piece 220 are always in contact with each other, and the configuration is similar to a horizontally long clothes pin. When the paper clip 200 is attached to the note Nt, the paper clip 200 functions to prevent the note Nt from being closed and also functions as what is generally called a paper weight that prevents the note Nt from moving on the position detection sensor 101.

As illustrated in FIG. 4B, a left coil 211L is provided on a left end section in the longer direction inside of the lower clipping piece 210 of the paper clip 200, and a right coil 211R is provided on a right end section in the longer direction. The left coil 211L and the right coil 211R are provided at, for example, positions symmetrical about the center position in the longer direction of the lower clipping piece 210. Therefore, a distance Lg between the left coil 211L and the right coil 211R is also determined in advance.

As illustrated in FIG. 4C, a left capacitor 212L is connected to the left coil 211L, and a right capacitor 212R is connected to the right coil 211R. In this way, the left coil 211L and the left capacitor 212L provide a left resonant circuit 213L, and the right coil 211R and the right capacitor 212R provide a right resonant circuit 213R.

It is assumed that the note Nt provided with the paper clip 200 is placed on the position detection sensor 101 of the position detection apparatus 100. In this case, current is supplied to the loop coil of the position detection sensor 101 to generate a magnetic field, and the resonant circuits 213L and 213R of the paper clip 200 resonate. Current is induced in the coils 211L and 211R, and magnetic fields are generated. Therefore, when the supply of current to the loop coil of the position detection sensor 101 is stopped, the loop coil of the position detection sensor 101 receives the magnetic fields from the resonant circuits 213L and 213R of the paper clip 200, and the position of the paper clip 200 can be specified.

The length (width) of the paper clip 200 in the longer direction and the width of the note Nt are substantially the same. Therefore, once the width of the paper clip 200 and the width of the note Nt are brought in line with each other to attach the paper clip 200 to the note Nt, the position of the note Nt with respect to the paper clip 200 is also determined. The size of the note Nt is also determined in advance, and therefore, the position of the note Nt provided with the paper clip 200 on the position detection sensor 101 can also be specified if the position of the paper clip 200 on the position detection sensor 101 can be specified.

In this way, the paper clip 200 realizes the function of a writing medium position instruction tool that instructs the position of the note Nt on the position detection sensor 101. Note that the paper clip 200 is attached to the note Nt in the description here. However, the arrangement is not limited to this. The paper clip 200 can be attached to various notes or various pieces of paper by a simple action of sandwiching them.

[Configuration Example of Electronic Pen 300]

Figure 5A:
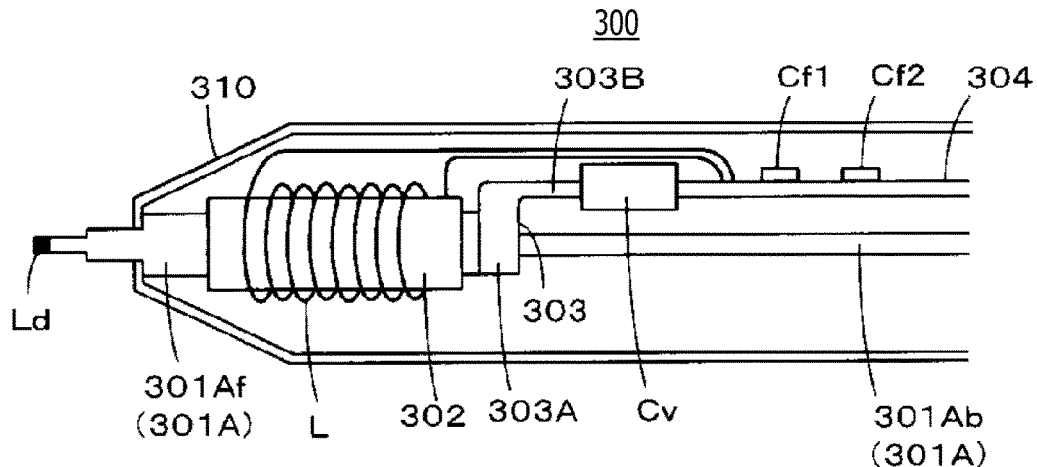
FIGS. 5A and 5B illustrate diagrams for describing a specific configuration example of the electronic pen.
Figure 5B:
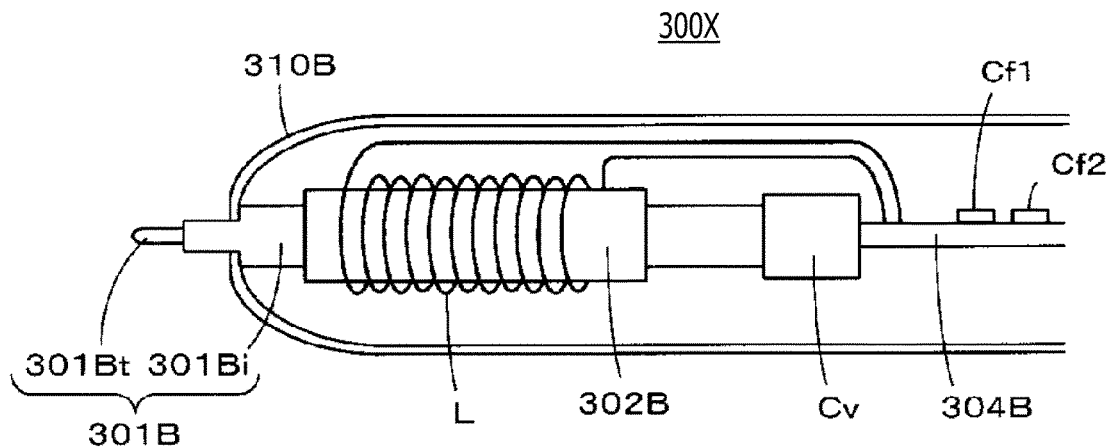

FIGS. 5A and 5B illustrate diagrams for describing a configuration example of the electronic pen 300. FIGS. 5A and 5B illustrates a state in which housings 310 and 310B are cut in half in the longer direction, and the housing on the near side is removed to expose the inside. The part closer to the pen tip with a characteristic configuration is enlarged in FIG. 5. FIG. 5A illustrates the electronic pen 300 including a mechanical pencil unit as a handwriting formation unit, and FIG. 5B illustrates an electronic pen 300X including a ballpoint pen unit as a handwriting formation unit.

<Configuration of Electronic Pen 300 Including Mechanical Pencil Unit>

As illustrated in FIG. 5A, a mechanical pencil unit 301A is provided inside of the housing 310, the mechanical pencil unit 301A including a front unit 301Af equipped with a feeding mechanism of the lead of the mechanical pencil and a back unit 301Ab provided with the lead of the mechanical pencil.

A cylindrical ferrite core 302 is provided around the front unit 301Af positioned inside of the housing 310, and the coil L for signal transmission and reception is wound around the side surface of the ferrite core 302. Both ends of the coil L are connected to an electronic circuit formed on a circuit board 304 provided parallel to the back unit 301Ab. The electronic circuit includes resonant capacitors Cf1 and Cf2, and the like.

A pen pressure transmission portion 303 including a ring-shaped portion 303A and a protrusion 303B fixed to the front unit 301Af is provided on the end portion of the front unit 301Af opposite the pen tip. The protrusion 303B of the pen pressure transmission portion 303 presses the pen pressure detector Cv. A signal line from the pen pressure detector Cv is connected to the electronic circuit of the circuit board 304 provided on the back side of the pen pressure detector Cv although not illustrated. The circuit board 304 is fixed in the housing 310, and the circuit board 304 fixes the pen pressure detector Cv to a predetermined position in the housing 310.

A knock button knocked by a finger of the user is provided on the end portion on the opposite side of the pen tip of the back unit 301Ab. The knock button can be attached to and detached from the back unit 301Ab, and when the knock button is removed, the lead of the mechanical pencil can be loaded from the opening on the back end of the back unit 310Ab. The knock button provided on the back unit 301Ab can be knocked (pressed) to send out the lead of the mechanical pencil from the front unit 301Af.

It is assumed that a lead Ld protruding from the pen tip of the front unit 301Af protruding from the opening at the tip of the housing 310 is pressed against the note Nt to perform writing. In this case, the lead Ld is used to record the handwriting in the note Nt. The front unit 301Af is pushed toward the back of the housing 310 in the axial direction, and the protrusion 303B of the pen pressure transmission portion 303 presses the pen pressure detector Cv. As a result, the pen pressure detector Cv detects the pen pressure, and the detected output from the pen pressure detector Cv is supplied to the electronic circuit of the circuit board 304.

In the part functioning as an electronic pen in the electronic pen 300, the coil L, the pen pressure detector Cv including the variable capacitor, the resonant capacitor Cf1, and the like provide a resonant circuit as illustrated on the upper left of FIG. 3. Therefore, the magnetic field (signal) from the position detection sensor 101 can be received for resonation, and a signal including the pen pressure information can be generated. The signal can be supplied (transmitted) to the position detection sensor 101 to instruct the position corresponding to the handwriting.

<Configuration of Electronic Pen 300X Including Ballpoint Pen Unit>

As illustrated in FIG. 5B, a ballpoint pen unit 301B is included inside of the housing 310B. The ballpoint pen unit 301B includes an ink loading portion 301Bi and a pen tip portion 301Bt including a ball at the tip that receives ink from the ink loading portion 301Bi and that uses the ink to record the handwriting.

A cylindrical ferrite core 302B is provided around the ink loading portion 301Bi positioned in the housing 310B, and the coil L for signal transmission and reception is wound around the side surface of the ferrite core 302B. Both ends of the coil L are connected to an electronic circuit formed on a circuit board 304B provided on the back stage. The electronic circuit includes the resonant capacitors Cf1 and Cf2, and the like.

The pen pressure detector Cv is provided on the end portion on the opposite side of the pen tip of the ballpoint pen unit 301B, and the pen pressure detector Cv can be pressed according to slide movement of the ballpoint pen unit 301B in the axial direction. A signal line from the pen pressure detector Cv is connected to the electronic circuit of the circuit board 304B provided on the back side of the pen pressure detector Cv although not illustrated. The circuit board 304 is fixed in the housing 310B, and the circuit board 304 fixes the pen pressure detector Cv to a predetermined position in the housing 310B.

When the pen tip portion 301Bt of the ballpoint pen unit 301B is pressed against the note Nt to perform writing, the ink is delivered from the tip of the pen tip portion 301Bt to record the handwriting in the note Nt, and the ballpoint pen unit 301B is pushed toward the back of the housing 310B in the axial direction to press the pen pressure detector Cv. As a result, the pen pressure detector Cv detects the pen pressure, and the detected output from the pen pressure detector Cv is supplied to the electronic circuit of the circuit board 304B.

In the part functioning as an electronic pen in the electronic pen 300X of the example including the ballpoint pen unit 301B, the magnetic field from the position detection sensor 101 can be received for resonation as in the mechanical pencil unit 301A, and a signal including the pen pressure information can be generated. The signal can be supplied (transmitted) to the position detection sensor 101, and the position corresponding to the handwriting can be instructed.

In this way, the electronic pen of the embodiment can include the handwriting formation unit, such as a mechanical pencil unit and a ballpoint pen unit, and the position instruction signal transmission circuit including the resonant circuit. Therefore, in addition to the mechanical pencil unit and the ballpoint pen unit, various units that can form handwriting, such as a fountain pen unit and a highlighter, can be used as the handwriting formation unit. The resonant circuit including the coil for signal transmission and reception and the resonant capacitor can be provided as the position instruction signal transmission circuit in various handwriting formation units. If the detection of the pen pressure is also necessary, the pen pressure detector Cv including the variable capacitor can be connected parallel to the resonant circuit.

[Configuration Example of Display Terminal 400 and Teacher Terminal 500]

Figure 6:
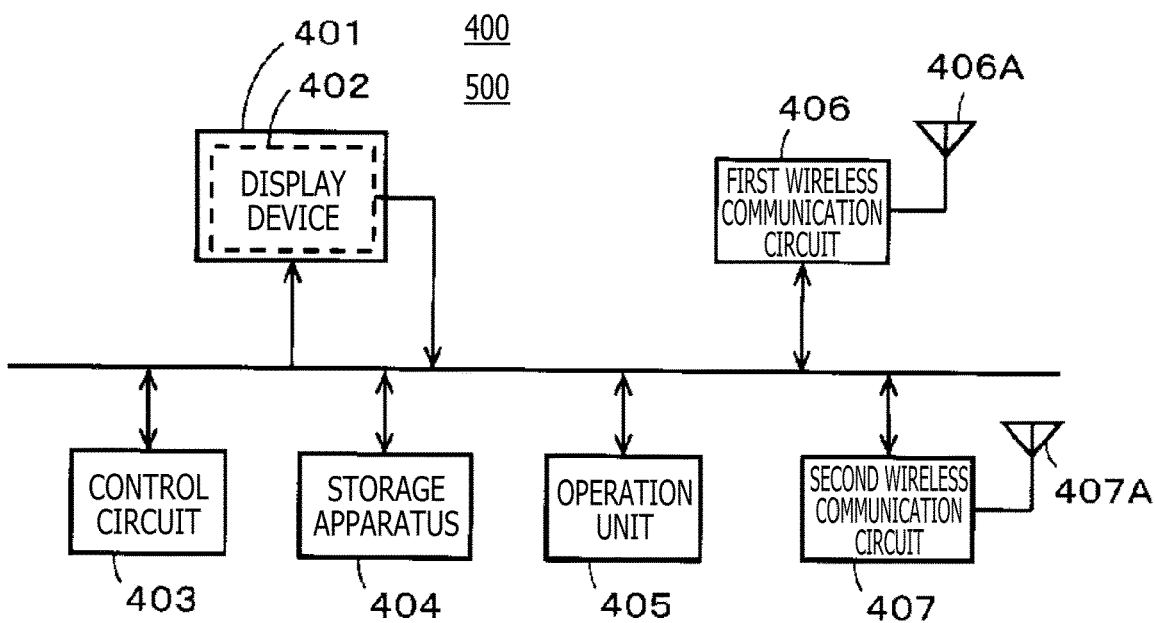
FIG. 6 is a diagram for describing a configuration example of a display apparatus and a teacher terminal.

FIG. 6 is a block diagram for describing a configuration example of the display terminal 400 and the teacher terminal 500. As also described above, the display terminal 400 and the teacher terminal 500 have substantially similar configurations. Therefore, the configuration example of the display terminal 400 will also be described for the configuration example of the teacher terminal 500 to simplify the description. As described above, the display terminal 400 is realized by, for example, a smartphone or a tablet computer. The smartphone or the tablet computer allows to make a call, perform transmission and reception for the electronic pen, and view a Web page through a telephone network or a wide area communication network such as the Internet.

However, the display terminal 400 of the embodiment is configured to display the image corresponding to the handwriting of the electronic pen 300 detected through the position detection sensor 101 of the position detection apparatus 100 and store and hold the image as necessary. Therefore, the configuration part related to the communication function through the wide area communication network generally included in the display terminal 400 and the description of the configuration part will be omitted, and the part for cooperating with the position detection apparatus 100 will be mainly described.

The display terminal 400 includes a touch panel provided with a touch sensor 402 according to a thin display device, such as a liquid crystal display (LCD) and an organic electro-luminescence (OEL) display. The touch panel is a user interface that realizes a display function and an input function. A control circuit 403 is a microprocessor connected to a central processing circuit (CPU), a read only memory (ROM), a random access memory (RAM), a non-volatile memory, and the like through a bus although not illustrated, and the control circuit 403 controls each component of the display terminal 400.

The control circuit 403 also functions as an execution circuit of application software that executes various types of application software. Therefore, the control circuit 403 executes application software for collaborating with the position detection apparatus 100, and the display terminal 400 functions as a display apparatus of the learning support system of the embodiment.

A storage apparatus 404 includes a recording medium, such as a semiconductor memory, with relatively large storage capacity and a driver of the recording medium. The storage apparatus 404 writes, reads, changes, and deletes various types of data. Data necessary for programs and processes of various types of application software, data obtained in various processes, and the like are stored in the storage apparatus 404. The storage apparatus 404 is also used as a work area for temporarily storing interim results of a process.

An operation unit 405 is provided with, for example, hardware keys operated by the user, such as an on/off key of power supply and some function keys. A first wireless communication circuit 406 is a part that realizes, for example, a short-range wireless communication function of Bluetooth (registered trademark) standard, and a second wireless communication circuit 407 is a part that realizes, for example, a wireless communication function of Wi-Fi (registered trademark) standard.

The control circuit 403 of the display terminal 400 can display the image corresponding to the coordinate information on the display device based on, for example, the coordinate information from the position detection apparatus 100 received through the first wireless communication circuit 406. The display terminal 400 can also write, in the storage apparatus 404, the image information displayed on the display device and read the image information as necessary to display and use the image information on the display device 401. In this way, the display terminal 400 has a function of displaying the handwriting recorded in the note Nt placed on the position detection sensor 101 and a function of storing and holding the handwriting to allow using the handwriting.

Note that as also described above, the display terminal 400 is realized by a smartphone or a tablet computer used by a school child. It is desirable that the teacher terminal 500 include a large display screen, and therefore, it is preferable that the teacher terminal 500 be realized by a tablet computer, a personal computer, or the like with a large display screen. Obviously, the display terminal 400 and the teacher terminal 500 dedicated to the learning support system may be provided and used.

[Process of Displaying Handwriting Recorded in Writing Medium Such as Note on Display Terminal 400]

FIGS. 7A, 7B, and 7C illustrate diagrams for describing a process of converting coordinates of the handwriting recorded in the writing medium into coordinates on the display device of the display terminal 400 or the teacher terminal 500 that is a display apparatus. FIG. 7A illustrates a case in which the note Nt provided with the paper clip 200 is obliquely inclined and placed on the position detection sensor 101 of the position detection apparatus 100. Note that in FIG. 7A, the position of the paper clip 200 is not indicated by the appearance of the paper clip 200, but is indicated by the positions of the left coil 211L and the right coil 211R recognized by the position detection sensor 101.

The position detection surface of the position detection sensor 101 is a horizontal surface crossing the gravity direction at right angles. Note that in the specification, a lateral direction H on the position detection surface (horizontal surface) of the position detection sensor 101 will be referred to as a lateral direction or a horizontal direction, and a longitudinal direction V intersecting the lateral direction (horizontal direction) H at right angles will be referred to as a longitudinal direction or a vertical direction as illustrated in FIG. 7A.

A range surrounded by a line Ln connecting the center of the left coil 211L and the center of the right coil 211R and dotted lines in FIG. 7A is the placement position of the note Nt on the position detection sensor 101. In lower grades of elementary schools, the note Nt is often obliquely put on the desk instead of putting the note Nt straight on the desk, and the body is also often inclined to write a note. Even a student or a pupil in a junior high school or in a higher grade often opens a text on the desk and obliquely puts the note in an empty space on the desk to take a note.

In such a case, even if the note Nt is obliquely put on the desk, the handwriting is usually recorded straight along ruled lines or the like of the note Nt. Therefore, although the handwriting is recorded straight on the note Nt, the note Nt is obliquely inclined and placed on the position detection sensor 101, and therefore, the coordinates of the handwriting detected by the position detection sensor 101 are detected as coordinates of handwriting obliquely inclined and written on the position detection sensor 101.

In this case, when the coordinate information of the handwriting detected through the position detection sensor 101 is used to display the handwriting on the display device of the display terminal 400, the handwriting displayed on the display device of the display terminal 400 is also inclined. As a result, although the note Nt is written straight, the handwriting written on the note Nt and the handwriting displayed on the display device of the display terminal 400 are in different modes, and the image corresponding to the handwriting displayed on the display device of the display terminal 400 becomes hard to see. Therefore, it is desirable, if possible, to display the handwriting written in the note Nt on the display device of the display terminal 400 or the teacher terminal 500 while maintaining the state written in the note Nt.

Thus, the control circuit 111 of the position detection apparatus 100 of the embodiment includes the coordinate conversion circuit 111A. In the function of the coordinate conversion circuit 111A, an affine transformation is used to convert the coordinate information of the handwriting detected by the position detection sensor 101 into coordinate information that allows to appropriately display the image of the handwriting on the display device of the display terminal 400. A specific conversion method will be described.

First, (1) the coordinate system of the note Nt is set. As illustrated in FIG. 7A, the center position of the left coil 211L of the paper clip 200 is set as the origin of the coordinate system of the note Nt. The line Ln connecting the center position of the left coil 211L and the center position of the right coil 211R is then set as an X-axis of the coordinate system of the note Nt.

Next, (2) coordinates for converting the coordinates on the position detection sensor 101 into coordinates of the coordinate system of the note Nt are set. That is, as illustrated in FIG. 7A, a line passing through the center position of the left coil 211L and parallel to the lateral direction (horizontal direction) H of the position detection sensor 101 is set as a reference line FL. An angle θ of an angle formed by the reference line FL and the line Ln is then obtained. The angle θ is an inclination of the note Nt provided with the paper clip 200 on the position detection sensor 101 and is an angle of rotation. The angle θ is set by assigning values to the rotation formula of the affine transformation of FIG. 7B.

Next, (3) coordinates (xp, yp) of the instruction position of the electronic pen 300 on the position detection sensor 101 are specified based on the detected output from the position detection circuit 109. In addition, (4) the coordinate conversion circuit 111A uses the rotation formula of the affine transformation illustrated in FIG. 7B to convert the coordinates (xp, yp) into coordinates on the coordinate system of the note Nt to calculate coordinates (xtp, ytp).

Next, (5) the coordinate system of the note Nt and the converted coordinates (xtp, ytp) of the instruction position of the electronic pen 300 are displayed on the display terminal 400. In this case, the center of the left coil 211L is set as the origin, and the line Ln connecting the center position of the left coil 211L and the center position of the right coil 211R is set as the X-axis. Therefore, the coordinate system and the coordinates (xtp, ytp) can be displayed on the display terminal 400 as it is.

The coordinates (xtp, ytp) after conversion indicate coordinates corresponding to a position Pt where the upper left end of the display terminal 400 is set as (0, 0), and the upper right end is set as (xmax, 0) as illustrated in FIG. 7C. Note that "xmax" denotes a maximum value in the X-axis direction.

FIGS. 8A, 8B, and 8C illustrates diagrams for describing a specific example of converting the coordinates instructed in the note Nt placed on the position detection sensor 101 into the coordinates on the display device of the display terminal 400. FIG. 8A illustrates a display device 401 of the display terminal 400. FIG. 8B illustrates a case in which the note Nt provided with the paper clip 200 is inclined slightly to the right and placed on the position detection sensor 101. FIG. 8C illustrates a case in which the note Nt provided with the paper clip 200 is inclined slightly to the left and placed on the position detection sensor 101. As illustrated in FIGS. 8B and 8C, the placement positions of the note Nt on the position detection sensor 101 are also different.

However, it is assumed that a position P1 instructed by the electronic pen 300 in FIG. 8B and a position P2 instructed by the electronic pen 300 in FIG. 8C are the same position on the note Nt. In this case, the placement positions of the note Nt on the position detection sensor 101 are different, and coordinates (xp1, yp1) of the position P1 illustrated in FIG. 8B and coordinates (xp2, yp2) of the position P2 illustrated in FIG. 8C are different.

Therefore, the coordinate conversion circuit 111A figures out the direction and the amount of inclination (degrees of angle of rotation) of the note Nt on the position detection sensor 101 as described with reference to FIG. 7. The affine transformation is used to convert the coordinate information of the position instructed on the inclined and placed note Nt into the coordinate information instructed on the note Nt placed straight on the position detection sensor 101. The coordinate information after the conversion is further converted into the coordinate information corresponding to the coordinate system of the note Nt. In this case, the coordinate system of the note Nt denotes a coordinate system, in which the center of the left coil 211L is the origin, and the axes orthogonal to the horizontal direction H and the vertical direction V at the origin are the X-axis and the Y-axis.

In this way, when the same position is instructed on the note Nt, the coordinates can be converted into the same coordinates on the display device of the display terminal 400 as illustrated in FIGS. 8A, 8B, and 8C even if the placement positions and the inclinations (angles of rotation) on the position detection sensor 101 are different. That is, when the position P1 of FIG. 8B and the position P2 of FIG. 8C are the same position on the note Nt, the coordinates can be converted into the same coordinates indicating the position Pt of FIG. 8A even if the placement positions and the inclinations (angles of rotation) on the position detection sensor 101 are different as also described above.

Figure 9B:
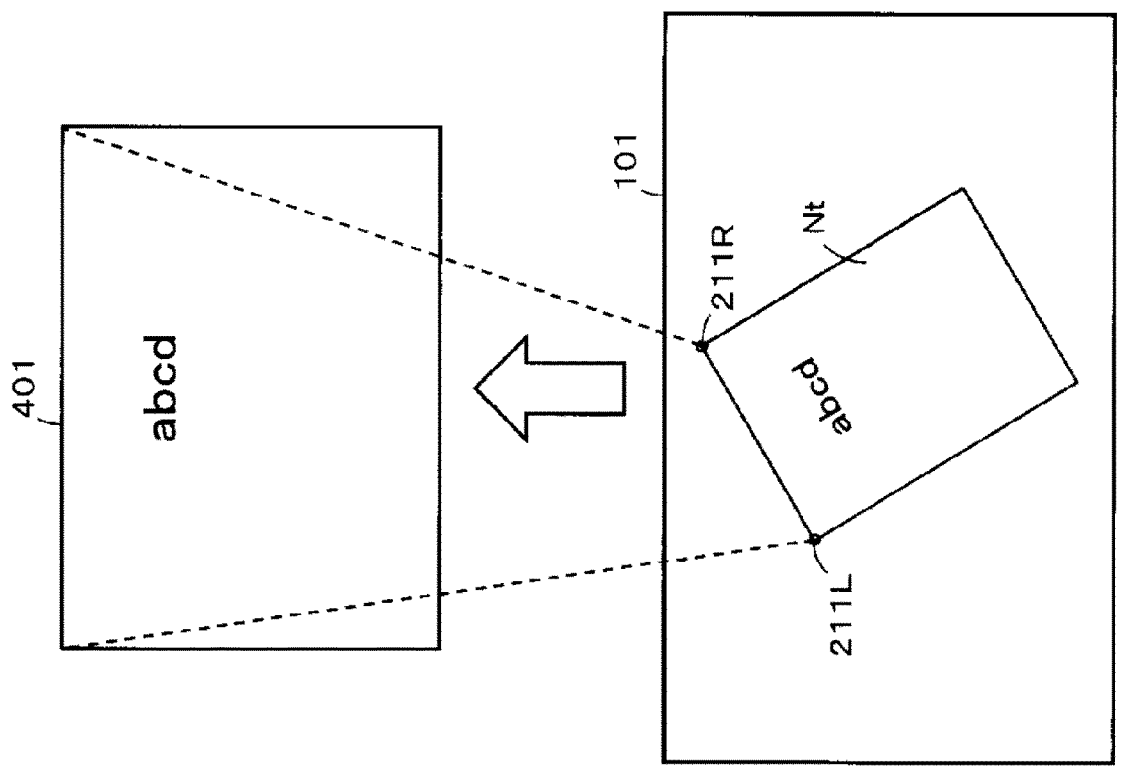
FIGS. 9A and 9B illustrate diagrams for describing an example of displaying, on the display device of the display apparatus, the handwriting recorded in the writing medium placed on the position detection sensor.
Figure 9A:
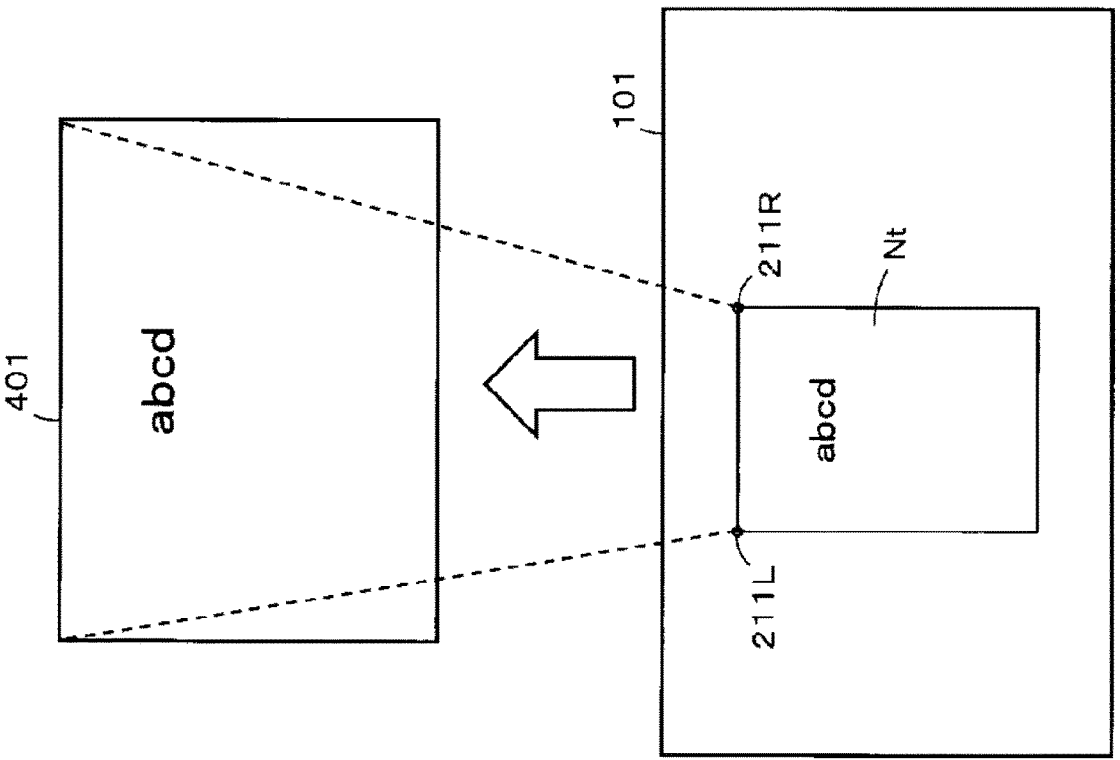

FIGS. 9A and 9B illustrates diagram for describing an example of displaying, on the display device 401 of the display terminal 400, the handwriting recorded in the note Nt placed on the position detection sensor 101. As illustrated in FIG. 9A, it is assumed that the note Nt is placed on the position detection sensor 101 so that the horizontal direction H of the position detection surface (horizontal surface) of the position detection sensor 101 and the upper side and the lower side of the note Nt are parallel to each other. As illustrated on the lower side of FIG. 9A, it is assumed that the electronic pen 300 is used to write characters "abcd" straight in the horizontal direction of the note Nt.

In this case, the directions of the X-axis and the Y-axis of the coordinate system of the position detection sensor 101 match the directions of the X-axis and the Y-axis of the coordinate system of the note Nt, and therefore, the coordinates are not converted. As a result, the image of the handwriting displayed by using the coordinates corresponding to the handwriting of the characters "abcd" written on the note Nt is also displayed straight in the horizontal direction on the display device 401 of the display terminal 400 as illustrated on the upper side of FIG. 9A.

On the other hand, it is assumed that the note Nt is inclined and placed on the position detection sensor 101 as illustrated in FIG. 9B. As illustrated on the lower side of FIG. 9B, it is assumed that the electronic pen 300 is used to write characters "abcd" parallel to the upper side and the lower side of the note Nt.

In this case, the directions of the X-axis and the Y-axis of the coordinate system of the position detection sensor 101 and the directions of the X-axis and the Y-axis of the coordinate system of the note Nt do not match, and the angle of rotation θ of the note Nt with respect to the position detection sensor 101 is not "0 (zero)." That is, the coordinates of the handwriting of the characters "abcd" written on the note Nt are detected as coordinates of the handwriting inclined and written on the position detection sensor 101 even if the handwriting is straight on the note Nt as illustrated on the lower side of FIG. 9B.

However, as described above, the position detection apparatus 100 uses the function of the coordinate conversion circuit 111A of the control circuit 111 to convert the coordinates of the coordinate information on the position detection sensor 101 detected by the position detection circuit 109. The coordinate conversion includes the process of correcting the angle of rotation by using the rotation formula of the affine transformation and the process of converting the coordinate system of the position detection sensor 101 into the coordinate system of the note Nt as also described above. As a result, the image corresponding to the character "abcd" written on the obliquely placed note Nt is also displayed as an image written straight in the horizontal direction H on the display device 401 of the display terminal 400 as illustrated on the upper side of FIG. 9B.

In this way, regardless of how the note Nt provided with the paper clip 200 is placed on the position detection sensor 101, the image corresponding to the handwriting recorded in the note Nt can be displayed on the display device of the display terminal 400 in the mode recorded in the note Nt. As a result, the information recorded in the note Nt can also be checked through the display terminal 400 in the mode recorded in the note Nt. When the teacher terminal 500 is prepared, the teacher can use the display image of the teacher terminal 500 to simply and accurately figure out the learning situation of each one of the school children in real time.

The handwriting information displayed on the display device of the display terminal 400 can be stored in the storage apparatus 404 of the display terminal 400, and the handwriting information stored in the storage apparatus 404 can be displayed and used on the display device of the display terminal 400 even when the note Nt is submitted to the teacher. Therefore, the information can be reviewed without the note Nt. The handwriting information can be managed in two sections including the note Nt and the storage apparatus 404 of the display terminal 400, and there is no trouble in checking the content of learning even if the note Nt is lost.

[Determination of Type of Note and Cooperation with Display Apparatus]

For example, there is a note for mathematics in mathematics, and there is a note for English in English. In this way, the notes used for learning often vary between subjects. Ruled lines, squares, and the like provided in the notes also vary between the notes used on the basis of subjects. Therefore, a plurality of paper clips including resonant circuits that transmit placement position instruction signals with different frequencies are prepared, and different paper clips are allocated to the subjects. That is, the paper clips that transmit the placement position instruction signals with different frequencies are allocated on the basis of subjects.

In the position detection apparatus 100, the position detection circuit 109 that also functions as a placement position detection circuit detects the frequency of the signal from the paper clip and notifies the control circuit 111 of the detection result. The control circuit 111 determines the subject of the note placed on the position detection sensor 101 based on the detection result of the frequency of the signal from the paper clip received from the position detection circuit 109. Therefore, although not illustrated, the control circuit 111 includes a memory that stores data associating the frequencies with the subjects of the signals from the paper clips.

The control circuit 111 then notifies the display terminal 400 and the teacher terminal 500 of the determination result of the subject of the note arranged on the position detection sensor 101 through the wireless communication circuit 103. Each of the display terminal 400 and the teacher terminal 500 that has received the determination result displays, on the display device, the image of the ruled lines or the squares corresponding to the note of the subject indicated in the determination result and displays the image corresponding to the handwriting on the image of the ruled lines or the squares. In this way, the images displayed on the display terminal 400 and the teacher terminal 500 can also be appropriate images according to the note corresponding to each subject.

Figure 10A:
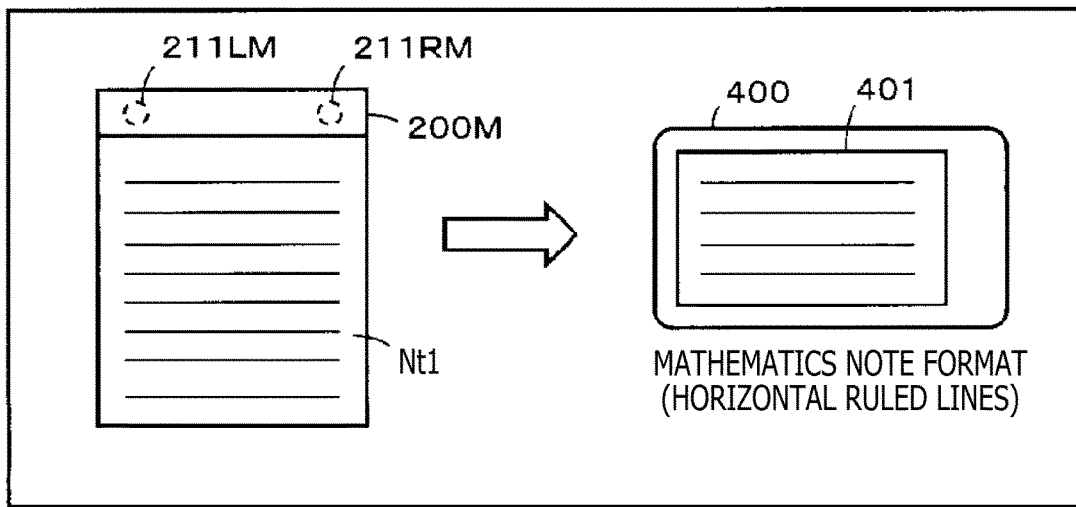
FIGS. 10A, 10B, and 10C illustrates diagrams for describing cooperation of devices when different paper clips are used on the basis of subjects.
Figure 10B:
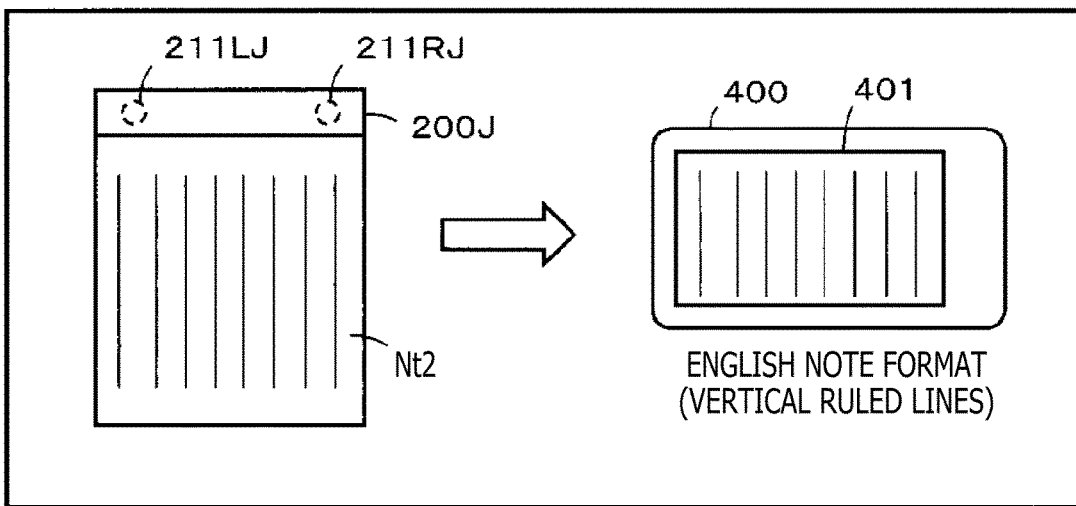
Figure 10C:
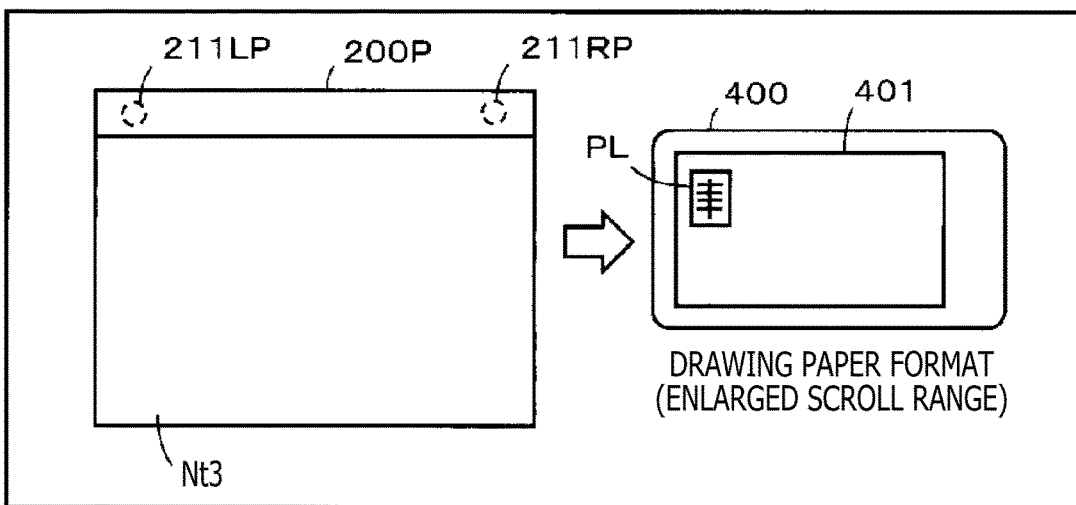

FIGS. 10A, 10B, and 10C illustrate diagrams for describing cooperation with the display terminal 400 when different paper clips are used on the basis of subjects. FIG. 10A illustrates a case in which a paper clip 200M for mathematics is attached to a mathematics note Nt1. In this case, coils 211LM and 211RM providing a resonant circuit transmit signals with a first frequency f1.

Therefore, when the mathematics note Nt1 provided with the paper clip 200M is placed on the position detection sensor 101, the position detection circuit 109 and the control circuit 111 of the position detection apparatus 100 can collaborate to determine that the frequency of the signals from the paper clip 200M is f1 and that the mathematics note Nt1 is placed according to the frequency. As also described above, the position detection apparatus 100 notifies the display terminal 400 of the determination result through wireless communication. Accordingly, an image in a mathematics note format with horizontal ruled lines can be displayed on the display device 401 in the display terminal 400, and an image corresponding to the handwriting can be superimposed and displayed on the image.

FIG. 10B illustrates a case in which a paper clip 200J for English is attached to an English note Nt2. In this case, coils 211LJ and 211RJ providing a resonant circuit transmit signals with a second frequency f2. Therefore, when the English note Nt2 provided with the paper clip 200J is placed on the position detection sensor 101, the position detection circuit 109 and the control circuit 111 of the position detection apparatus 100 can collaborate to determine that the frequency of the signals from the paper clip 200J is f2 and that the English note Nt2 is placed according to the frequency. The position detection apparatus 100 notifies the display terminal 400 of the determination result through wireless communication. Accordingly, an image in an English note format with vertical ruled lines can be displayed on the display device 401 in the display terminal 400, and an image corresponding to the handwriting can be superimposed and displayed on the image.

FIG. 10C illustrates a case in which a paper clip 200P for drawing paper is attached to drawing paper Nt3. In this case, coils 211LP and 211RP providing a resonant circuit transmit signals with a third frequency f3. Therefore, when the drawing paper Nt3 provided with the paper clip 200P is placed on the position detection sensor 101, the position detection circuit 109 and the control circuit 111 of the position detection apparatus 100 can collaborate to determine that the frequency of the signals from the paper clip 200P is f3 and that the drawing paper Nt3 is placed according to the frequency. The position detection apparatus 100 notifies the display terminal 400 of the determination result through wireless communication. Accordingly, an image in a drawing paper note format with an enlarged scroll range can be displayed on the display device 401 in the display terminal 400, and an image corresponding to the handwriting can be superimposed and displayed on the image.

Note that when the drawing paper format is displayed, a color palette PL or the like for selecting colors to be used can be displayed on the display device 401, and the user can use a finger, a passive pen, or the like to select a color to be used according to a touch operation. A necessary section can be colored by tracing the section by the finger or the passive pen. That is, sketching can be performed on the drawing paper Nt3, and coloring can be performed on the display terminal 400. Note that the image finished with coloring can be transmitted from the display terminal 400 to the teacher terminal 500 to submit the image.

[Summary of Process Executed by Position Detection Apparatus 100]

Figure 11:
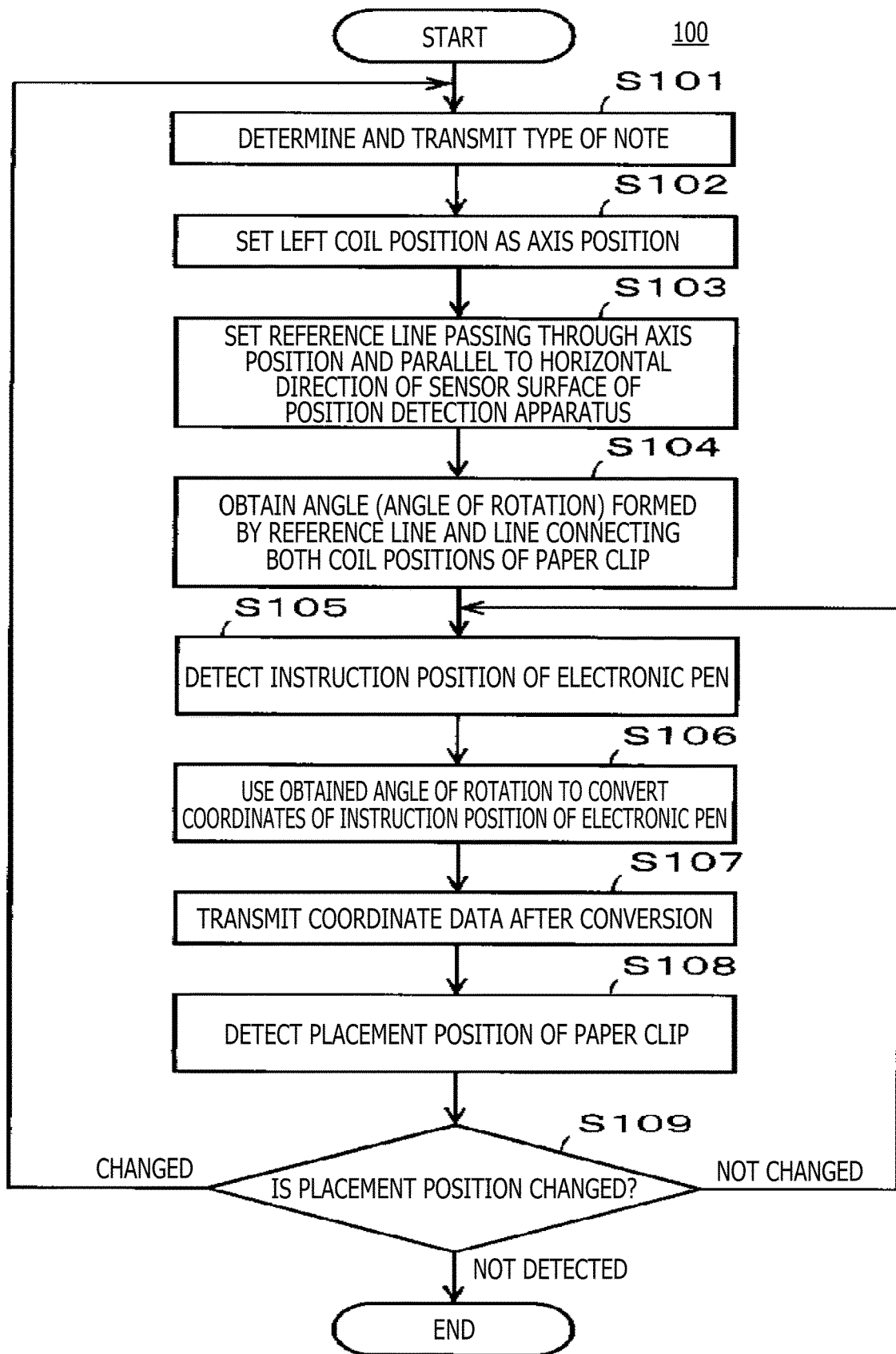
FIG. 11 is a flow chart for describing a process executed by the position detection apparatus.

FIG. 11 is a flow chart for describing part of the process executed by the position detection apparatus 100, from the type determination process of the paper clip 200 to the coordinate conversion process of the handwriting. In the position detection apparatus 100, the control circuit 111 controls execution of what is generally called a scanning process to execute the process of detecting the placement position of the paper clip 200 and the instruction position of the electronic pen 300. The scanning process is a process of detecting the instruction position or the like by alternately providing a transmission period for supplying current to the loop coil to transmit a signal and a reception period for stopping the supply of current to receive a signal from the outside while switching the loop coil of the position detection sensor 101.

The placement position of the paper clip 200 and the instruction position of the electronic pen 300 need to be distinguished and detected. In the embodiment, the frequency of the placement position instruction signal from the paper clip 200 and the frequency of the position instruction signal from the electronic pen 300 are different. Here, the paper clip 200 is a general term for various paper clips of different subjects. Therefore, the frequencies of the placement position instruction signals of various paper clips on the basis of subjects and the frequency of the position instruction signal of the electronic pen 300 do not overlap and are different.

The position detection apparatus 100 of the embodiment executes only the detection process of the placement position of the paper clip 200 just after the activation of power or when the placement of the paper clip 200 is not detected. This is because if the paper clip 200 is not placed on the position detection sensor 101, the note Nt provided with the paper clip 200 is not placed, and writing is not performed by using the electronic pen 300. Therefore, the instruction position of the electronic pen 300 does not have to be detected yet.

It is assumed that the control circuit 111 has detected the placement of the paper clip 200 on the position detection sensor 101 based on the detected output from the position detection circuit 109. In this case, the control circuit 111 executes the process illustrated in FIG. 11 to execute the detection process of the placement position of the paper clip 200 and the detection process of the instruction position of the electronic pen 300 at different times. That is, the control circuit 111 executes the detection process of the placement position of the paper clip 200 and the detection process of the instruction position of the electronic pen 300 in a time-sharing manner.

That is, as described above, the control circuit 111 only detects the placement position of the paper clip 200 when the placement of the paper clip 200 on the position detection sensor 101 is not detected. Next, the control circuit 111 receives the signals from the left coil 211L and the right coil 211R of the paper clip 200 based on the detected output from the position detection circuit 109. Once the control circuit 111 detects the placement of the paper clip 200, the control circuit 111 executes the process illustrated in FIG. 11.

The control circuit 111 first specifies the frequency of the signal from, for example, the left coil 211L of the paper clip 200 based on the detected output from the position detection circuit 109. The control circuit 111 then determines the type of the note Nt provided with the placed paper clip 200 from the specified frequency and transmits the type to the display terminal 400 and the teacher terminal 500 (S101).

The control circuit 111 can transmit the type to the display terminal 400 through the first wireless communication circuit 103A and transmit the type to the teacher terminal 500 through the second wireless communication circuit 103B. Obviously, the control circuit 111 can use one of the first wireless communication circuit 103A and the second wireless communication circuit 103B to transmit the type to both the display terminal 400 and the teacher terminal 500. In this way, the format corresponding to the note Nt placed on the position detection sensor 101 received from the position detection apparatus 100 can be displayed on the display devices in the display terminal 400 and the teacher terminal 500.

The coordinate conversion circuit 111A then specifies the position of the left coil 211L and the position of the right coil 211R of the paper clip 200 based on the detected output from the position detection circuit 109 and sets the position of the left coil (center position of left coil) as the axis position (S102). Next, the coordinate conversion circuit 111A sets the reference line FL passing through the axis position and parallel to the horizontal direction H of the sensor surface of the position detection apparatus 100 (horizontal surface of position detection sensor 101) as described with reference to FIG. 7A (S103).

Subsequently, the coordinate conversion circuit 111A obtains the angle θ of the angle (angle of rotation) formed by the reference line FL and the line Ln connecting the center position of the left coil 211L and the center position of the right coil 211R as described with reference to FIG. 7A (S104). The control circuit 111 then detects the instruction position of the electronic pen 300 based on the detected output from the position detection circuit 109 (S105). The coordinate conversion circuit 111A then functions to use the angle θ obtained at S104 to execute the rotation process of affine transformation (FIG. 7B) to convert the coordinates of the instruction position of the electronic pen 300 from the position detection circuit 109 into the coordinates of the instruction position (S106).

Note that the process of converting the coordinate information obtained in the rotation process into the coordinate information corresponding to the coordinate system of the note Nt provided with the paper clip 200 is also executed at S106 as described with reference to FIG. 7C. The coordinate information after coordinate conversion is transmitted to the display terminal 400 and the teacher terminal 500 along with the pen pressure information from the pen pressure detection circuit 110 (S107).

In the transmission process of S107, the control circuit 111 can transmit the information to the display terminal 400 through the first wireless communication circuit 103A and transmit the information to the teacher terminal 500 through the second wireless communication circuit 103B as in the transmission process at S101. Obviously, the control circuit 111 can use one of the first wireless communication circuit 103A and the second wireless communication circuit 103B to transmit the information to both the display terminal 400 and the teacher terminal 500. In this way, the coordinate information and the pen pressure information corresponding to the handwriting of the electronic pen 300 from the position detection apparatus 100 are provided in the display terminal 400 and the teacher terminal 500, and the image corresponding to the handwriting can be displayed on the display device of the display terminal 400 and the display device of the teacher terminal 500.

Subsequently, the control circuit 111 detects the placement position of the paper clip 200 based on the detected output from the position detection circuit 109 (S108) and determines whether or not there is a change from the placement position of the last time (S109). If the control circuit 111 determines that the placement position of the paper clip 200 is not changed in the determination process at S109, the control circuit 111 repeats the process from S105. That is, the control circuit 111 continuously executes the process of detecting the instruction position of the electronic pen 300, converting the coordinates, and transmitting the information to the display terminal 400 and the teacher terminal 500.

If the control circuit 111 determines that the placement position of the paper clip 200 is changed (shifted) in the determination process at S109, the control circuit 111 repeats the process from S101. As a result, the control circuit 111 obtains the angle θ of the angle of rotation again and maintains the state in which the coordinates can be appropriately converted. Furthermore, it is assumed that the control circuit 111 determines that the placement position of the paper clip 200 cannot be detected in the determination process at S109. In this case, the paper clip 200 is not on the position detection sensor 101, and the control circuit 111 ends the process illustrated in FIG. 11 and executes only the detection process of the placement position of the paper clip 200 as also described above. The process described with reference to FIG. 11 is executed again when the control circuit 111 determines that the placement of the paper clip 200 on the position detection sensor 101 is detected.

Advantageous Effects of Embodiment

According to the learning support system of the embodiment, the learner, such as a school child, does not have to input information to the personal computer, the tablet computer, or the like. The learner can use an existing method, such as recording handwriting in a note, to take a class or the like. The image corresponding to the handwriting recorded in the note can be figured out in the teacher terminal 500, and the learning status of the learner can be appropriately figured out.

In this case, only the position detection apparatus 100, the paper clip 200, and the electronic pen 300 provided on the desk are the devices necessary on the learner side, and the learning environment is not significantly changed. In addition, the teacher terminal 500 is provided on the teacher side, and the situation of the learner can be appropriately figured out.

The learner can also use the display terminal 400 to check the handwriting recorded in the note through the display terminal 400 or to store the handwriting information and use the handwriting information as necessary. Therefore, even if the learner submits the note recording the handwriting to the teacher, the learner can use the handwriting information of the display terminal 400 to review the information.

In addition, the handwriting information displayed on the teacher terminal 500 or the display terminal 400 can be displayed just like the handwriting written on the note even if, for example, the note is obliquely placed on the position detection sensor 101 provided on the top plate of the desk.

In addition, the paper clip 200 that transmits different placement position instruction signals on the basis of subjects can be used to appropriately figure out the type of note placed on the position detection sensor 101 and execute a process corresponding to the placed note.

[Modifications]
<Change in System Configuration>

Although the learning support system includes the position detection apparatus 100, the paper clip 200, the electronic pen 300, the display terminal 400, and the teacher terminal 500 in the embodiment, the configuration is not limited to this. For example, the display terminal 400 may not be provided, and the learning support system may include the position detection apparatus 100, the paper clip 200, the electronic pen 300, and the teacher terminal 500.

<Transmission of Identification Information from Paper Clip 200>

Although the frequency of the placement position instruction signals transmitted from the left coil 211L and the right coil 211R of the paper clip 200 indicates the type of note, such as a subject, in the embodiment, the configuration is not limited to this. For example, on/off switches and control circuits that control the on/off switches may be provided on the left resonant circuit 213L and the right resonant circuit 213R, and an on/off pattern of the transmitted placement position instruction signals may indicate the type of note such as a subject.

In this case, the position detection circuit 109 in the position detection apparatus 100 detects the on/off pattern of the placement position instruction signals and notifies the control circuit 111 of the on/off pattern. The control circuit 111 can include a memory storing a table associating the on/off patterns with the types, such as subjects, and the control circuit 111 can determine the type of the paper clip 200.

In addition, the paper clip for mathematics or English note and the paper clip for drawing paper have different widths in the longer direction as described with reference to FIG. 10. Therefore, for example, a paper clip with a different distance (interval) between the left coil 211L and the right coil 211R is provided for each subject. The position detection circuit 109 of the position detection apparatus 100 may detect the distance between the left coil 211L and the right coil 211R, and the control circuit 111 may determine the type of note provided with the paper clip according to the distance. In this case, a table associating the distance between the left coil 211L and the right coil 211R with the type of note can be prepared in a memory accessible by the control circuit 111.

<Detection of Placement Position of Paper Clip 200 and Detection of Instruction Position of Electronic Pen>

Although the instruction position of the electronic pen 300 and the placement position of the paper clip 200 are alternately detected in the embodiment, the frequencies of detection may be different. That is, the frequency that the paper clip 200 is moved on the position detection sensor 101 can be significantly lower than the frequency that the instruction position of the electronic pen 300 is changed. Therefore, for example, the placement position of the paper clip 200 can be detected once while the electronic pen is detected ten times, and the instruction position of the electronic pen 300 can be always detected when the placement position of the paper clip 200 is not detected. In this way, the placement position of the paper clip 200 and the instruction position of the electronic pen 300 can be detected in a complete time-sharing manner. The control circuit 111 can control the detection.

<Detection of Electronic Pen 300 when Paper Clip 200 is not Placed>

Although the instruction position of the electronic pen 300 is not detected unless the paper clip 200 is placed on the position detection sensor 101 in the embodiment, the configuration is not limited to this. The entire surface of the position detection sensor 101 may be displayed on the display terminal 400 if the paper clip 200 is not placed. That is, the handwriting written on the desk may be displayed in the state of the positional relationship on the desk.

<Placement of a Plurality of Paper Clips 200>

Although the embodiment of a single paper clip 200 has been described, a plurality of notes provided with the paper clips 200 may be placed on the desk. As for the display on the display terminal 400, the notes with the handwriting written by the electronic pens 300 may be displayed, or the display area may be divided according to the plurality of paper clips and displayed.

<Electronic Pen Corresponding to Eraser>

An electronic pen including an eraser can also be prepared instead of the mechanical pencil unit or the ballpoint pen unit. In the case of the electronic pen including an eraser, position instruction signals with a different frequency from the frequency of the electronic pen including the mechanical pencil unit or the ballpoint pen unit are transmitted. It is assumed that the electronic pen 300 including the mechanical pencil unit or the electronic pen 300X including the ballpoint pen unit provided with erasable ink is used to leave handwriting on the note, and the electronic pen including the eraser is used to erase the handwriting.

In this case, the type of electronic pen can be recognized from the frequency of the position instruction signals. The position detection circuit 109 can recognize the instruction position of the electronic pen including an eraser, and the instruction position is an erasure position of the eraser. Therefore, the control circuit 111 of the position detection apparatus 100 transmits, to the display terminal 400 and the teacher terminal 500, the fact that the electronic pen including an eraser is used and the coordinate information of the instruction position of the electronic pen including the eraser. The coordinates in the coordinate information in this case are converted just like the coordinates of the handwriting described above. As a result, the control circuit 403 can recognize the erasure position in the display terminal 400 and the teacher terminal 500, and the part erased by using the eraser can be erased in the displayed handwriting. That is, the image corresponding to the handwriting can be displayed, and the handwriting erased by the eraser can be erased.

<Location for Providing Position Detection Sensor 101>

Although the position detection sensor 101 is provided on the entire surface of the upper surface of the top plate of the desk in the embodiment described above, the arrangement is not limited to this. The position detection sensor 101 may be provided on the entire surface of the lower surface of the top plate of the desk. When the top plate includes a plurality of stacked plates, the position detection sensor 101 may be inserted and provided between the stacked plates. Obviously, the material of the top plate can be materials with various types of quality that do not adversely affect the transmission and reception of the signals. The sensor may also be incorporated into a desk mat placed on the desk.

<Size and the Like of Display Terminal 400>

It is preferable that the area of the display device 401 of the display terminal 400 used by the learner, such as a school child, be smaller than the area of the sensor surface of the position detection sensor 101. This is because the display device 401 is used on the desk. Obviously, a display apparatus including a display device with a large screen, such as a projector and a large screen display, can be used to allow all of the learners to see the recording information (handwriting information) in the note of the learner, such as a school child, and share the content.

<Use of a Plurality of Electronic Pens>

A plurality of electronic pens including mechanical pencil units provided with the lead of mechanical pencils of different colors or a plurality of electronic pens including ballpoint pen units provided with the ink of different colors are prepared, and all of the electronic pens transmit position instruction signals with different frequencies. The colors of handwriting that can be provided by the electronic pens are recognized by the functions of, for example, the position detection circuit 109 and the control circuit 111 of the position detection apparatus 100 according to the frequencies of the position instruction signals, and the information is transmitted to the display terminal 400 and the teacher terminal 500 through the wireless communication circuit 103. In this way, the display terminal 400 and the teacher terminal 500 can display not only the handwriting, but also the colors of the handwriting as written in the note.

Note that instead of recognizing each electronic pen based on the difference in the frequency of the position instruction signal, the electronic pen may transmit a specific on/off pattern of the position instruction signal as identification information, and the position detection apparatus 100 may recognize the type of the electronic pen based on the identification information. The identification information can also be recognized through the position detection circuit 109 and the control circuit 111 of the position detection apparatus 100.

<Use of One Desk by a Plurality of Persons>

Although the position detection apparatus 100 is provided on the desk for one person in the embodiment described above, the arrangement is not limited to this. For example, a plurality of participants sit around a large desk, such as what is generally called a round table, and hold a discussion while taking notes. Therefore, a position detection apparatus including a position detection sensor with a large sensor surface may be provided on the large desk such as a round table.

If the paper clips used by the participants output placement position instruction signals with different frequencies in this case, each of the participants can be specified according to the frequencies of the placement position instruction signals from the paper clips used by the participants. The specification process can also be executed through the position detection circuit 109 and the control circuit 111 of the position detection apparatus 100. Each participant can display, on the display apparatus with a large screen, the image corresponding to the handwriting recorded in the writing medium, such as a note, provided with the paper clip possessed by the participant. The discussion can be held while the information is shared by all of the participants.

<Variations of Paper Clip>

Although the width of the paper clip 200 is the same as the width of the opened note Nt in the embodiment described above, the configuration is not limited to this. The width of the paper clip 200 can be various lengths regardless of the width of the note. In this case, by setting the position for attaching the paper clip 200 to the writing medium, such as a note and a piece of paper, the placement position of the writing medium on the position detection sensor 101 can be specified from the placement position of the paper clip 200 on the position detection sensor 101. The width of the paper clip 200 may also be variable. In drawing pictures, the size of the drawing paper or the like may vary, and therefore, the width of the paper clip may be allowed to extend according to the size.

<Other Examples of Writing Medium Position Instruction Tool>

Note that although an example of an embodiment of the writing medium position instruction tool includes the paper clip 200 in the embodiment described above, the example is not limited to this. The writing medium position instruction tool can have, for example, a sticker-like configuration provided with the resonant circuit including the coils and the capacitors, and the writing medium position instruction tool may be pasted on the note or the piece of paper and used. Specifically, one writing medium position instruction tool may be pasted on each corner of the front cover and the back cover of the note. The writing medium position instruction tool may have, for example, a configuration of a paper weight including the resonant circuit including the coils and the capacitors, and the writing medium position instruction tool may be used on, for example, an upper edge of the note or the piece of paper placed on the position detection sensor 101. In summary, the writing medium position instruction tool attached to the writing medium, such as a note and a piece of paper, and having the function of transmitting the placement position instruction signal can be provided in various modes.

<Position Detection Apparatus, Electronic Pen, and Paper Clip of Active Capacitive Coupling System>

As also described above, the position detection apparatus, the electronic pen, and the paper clip of the active capacitive coupling system (active electrostatic (AES) system) can be used to provide the learning support system of the disclosure. In the active capacitive coupling system, the electronic pen transmits the signal from the oscillation circuit mounted on the electronic pen, and the position detection apparatus receives the signal to detect the instruction position and the pen pressure.

Therefore, in the electronic pen of the AES system, transmission conductors can be provided near the oscillation circuit and the pen tip, and a configuration for transmitting, from the transmission electrode, the position instruction signal including the information for instructing the instruction position and notifying the pen pressure can be provided. In the position detection apparatus of the AES system, electrodes of linear conductors arranged in the lateral direction and electrodes of linear conductors arranged in the longitudinal direction are stacked to provide the position detection sensor. The electrodes of the position detection sensor are sequentially switched to detect the electrode that is receiving the signal, and the instruction position is detected according to the position of the electrode receiving the position instruction signal from the electronic pen. The pen pressure is also detected from the information included in the received signal.

Instead of providing the resonant circuit on the paper clip, a left transmission conductor and a right transmission conductor are provided in place of the oscillation circuit of signal, the left coil 211L, and the right coil 211R, and the placement position instruction signals from the oscillation circuit are transmitted from the transmission conductors. The position detection apparatus can detect the placement position of the paper clip and the placement position of the writing medium provided with the paper clip as in the case of detecting the instruction of the electronic pen of the AES system.

In the learning support system including the position detection apparatus, the electronic pen, and the paper clip of the AES system, the conversion process of the coordinate information of the instruction position of the electronic pen can be executed as in the embodiment. That is, the conversion process of the coordinate information is similar to the case of the learning support system including the position detection apparatus, the electronic pen, and the paper clip of the EMS system.

[Etc.]

As can be understood from the description of the embodiment, the function of the handwriting formation unit of the electronic pen of the claims is realized by the mechanical pencil unit 301A of the electronic pen 300 and the ballpoint pen unit 301B of the electronic pen 300X. The function of the position instruction signal transmission circuit of the electronic pen of the claims is realized by the resonant circuit including the coil L, the resonant capacitor Cf, and the like. The function of the placement position instruction signal transmission circuit of the writing medium position instruction tool of the claims is realized by the left resonant circuit 213L including the left coil 211L and the left capacitor 212L and the right resonant circuit 213R including the right coil 211R and the right capacitor 212R of the paper clip 200.

The function of the position detection sensor circuit of the position detection apparatus of the claims is realized by the position detection sensor 101 of the position detection apparatus 100, and the functions of the placement position detection circuit and the instruction position detection circuit of the position detection apparatus of the claims are mainly realized by the position detection circuit 102 of the position detection apparatus 100. The function of the coordinate conversion circuit of the position detection apparatus of the claims is realized by the coordinate conversion circuit 111A of the position detection apparatus 100. The functions of the first transmission circuit, the second transmission circuit, the recognition result transmission circuit, the third transmission circuit, and the fourth transmission circuit of the position detection apparatus of the claims are realized by the wireless communication unit 103 of the position detection apparatus 100.

The function of the identification information detection unit of the position detection apparatus of the claims is realized by the position detection circuit 109 and the control circuit 111 of the position detection apparatus 100. The function of the detection control circuit of the position detection apparatus of the claims is realized by the control circuit 111 of the position detection apparatus 100. The function of the erasure instruction position detection circuit of the position detection apparatus of the claims is realized by the position detection circuit 109 and the control circuit 111 of the position detection apparatus 100, and the function of the second coordinate conversion circuit of the position detection apparatus of the claims is realized by the coordinate conversion circuit 111A of the position detection apparatus 100.

The functions of the first reception circuit, the second reception circuit, the recognition result reception circuit, the third reception circuit, and the fourth reception circuit of the display apparatus of the claims are realized by the first wireless communication circuit 406, the antenna 406A, the second wireless communication circuit 407, and the antenna 407A of the display terminal 400 and the teacher terminal 500. The function of the display control circuit of the display apparatus of the claims is realized by the control circuit 403 of the display terminal 400 and the teacher terminal 500. The functions of the first determination circuit and the second determination circuit of the display apparatus of the claims are realized by the control circuit 403 of the display terminal 400 and the teacher terminal 500. The function of the erasure control circuit of the display apparatus is realized by the control circuit 403 of the display terminal 400 and the teacher terminal 500.

It is to be noted that the embodiments of the present disclosure are not limited to the foregoing embodiment, and that various changes can be made without departing from the spirit of the present disclosure.

What is claimed is:

1. A learning support system comprising:
   an electronic pen;
   a writing medium position instruction tool;
   a position detection apparatus; and
   a display apparatus,
   the electronic pen including:
      a handwriting formation unit which, in operation, leaves handwriting in a writing medium, and
      a position instruction signal transmission circuit which, in operation, transmits a position instruction signal to the position detection apparatus,
   the writing medium position instruction tool including:
      a placement position instruction signal transmission circuit configured to be attached to the writing medium and which, in operation, transmits, to the position detection apparatus, a placement position instruction signal that instructs a placement position of the writing medium,
   the position detection apparatus including:
      a position detection sensor including a plurality of electrodes in a first direction and in a second direction intersecting the first direction,
      a placement position detection circuit which, in operation, detects the placement position of the writing medium based on output from the position detection sensor corresponding to the placement position instruction signal when the writing medium provided with the writing medium position instruction tool is placed on the position detection sensor,
      an instruction position detection circuit which, in operation, detects an instruction position of the electronic pen based on the output from the position detection sensor corresponding to the position instruction signal when the electronic pen performs recording in the writing medium placed on the position detection sensor,
      a coordinate conversion circuit which, in operation, converts the instruction position of the electronic pen detected by the instruction position detection circuit into coordinate information to be displayed on a display device of the display apparatus based on the placement position of the writing medium detected by the placement position detection circuit, and
      a first transmission circuit which, in operation, transmits the coordinate information converted by the coordinate conversion circuit to the display apparatus, and
   the display apparatus including:
      a first reception circuit which, in operation, receives the coordinate information from the position detection apparatus, and
      a display control circuit which, in operation, displays the handwriting of the electronic pen on the display device based on the coordinate information received through the first reception circuit.

2. The learning support system according to claim 1, wherein:
   the placement position detection circuit and the instruction position detection circuit are included in a same circuit.

3. The learning support system according to claim 1, wherein:
   the placement position instruction signal transmitted from the placement position instruction signal transmission circuit of the writing medium position instruction tool includes predetermined identification information,
   the position detection apparatus further includes:
      an identification information detection circuit which, in operation, detects the predetermined identification information based on the output from the position detection sensor corresponding to the placement position instruction signal when the writing medium provided with the writing medium position instruction tool is placed on the position detection sensor, and
      a second transmission circuit which, in operation, transmits the predetermined identification information detected by the identification information detection circuit to the display apparatus,
   the display apparatus further includes:
      a second reception circuit which, in operation, receives the predetermined identification information from the position detection apparatus, and
      a first determination circuit which, in operation, determines a display format according to the predetermined identification information received through the second reception circuit, and
   the display control circuit, in operation, forms the handwriting of the electronic pen on the display format determined by the first determination circuit and causes the display device to display the handwriting.

4. The learning support system according to claim 3, wherein:
   the predetermined identification information included in the placement position instruction signal is indicated by a frequency of the placement position instruction signal, and
   the identification information detection circuit of the position detection apparatus, in operation, detects the predetermined identification information based on a frequency of the output from the position detection sensor corresponding to the placement position instruction signal.

5. The learning support system according to claim 3, wherein:
the predetermined identification information included in the placement position instruction signal indicates an on/off change state of the placement position instruction signal, and
the identification information detection circuit of the position detection apparatus, in operation, detects the predetermined identification information based on the on/off change state of the output from the position detection sensor corresponding to the placement position instruction signal.

6. The learning support system according to claim 1, wherein:
the writing medium position instruction tool further includes:
a clip structure including a lower clipping piece and an upper clipping piece that, in operation, sandwich the writing medium, and
the placement position instruction signal transmission circuit is provided on the lower clipping adjacent to respective ends of the lower clipping piece in a longer direction of the lower clipping piece.

7. The learning support system according to claim 6, further comprising:
a plurality of the writing medium position instruction tools in which intervals between the placement position instruction signal transmission circuits provided adjacent to respective ends of the lower clipping piece in the longer direction of the lower clipping piece are different,
wherein the position detection apparatus further includes:
a recognition circuit which, in operation, recognizes each of the plurality of writing medium position instruction tools based on the intervals between the placement position instruction signal transmission circuits provided adjacent to respective ends of the lower clipping piece in the longer direction of the lower clipping piece based on the output from the position detection sensor corresponding to the placement position instruction signal when a plurality of writing mediums provided with the writing medium position instruction tools are placed on the position detection sensor, and
a recognition result transmission circuit which, in operation, transmits a recognition result recognized by the recognition circuit to the display apparatus,
the display apparatus further includes:
a recognition result reception circuit which, in operation, receives the recognition result from the position detection apparatus, and
a second determination circuit which, in operation, determines a display format according to the recognition result received through the recognition result reception circuit, and
the display control circuit, in operation, forms the handwriting of the electronic pen on the display format determined by the second determination circuit and causes the display device to display the handwriting.

8. The learning support system according to claim 1, wherein the position detection apparatus further comprises:
a detection control circuit which, in operation, causes the placement position detection circuit and the instruction position detection circuit to operate in a time-sharing manner.

9. The learning support system according to claim 1, wherein:
the plurality of electrodes of the position detection sensor of the position detection apparatus includes a plurality of loop coils, and the position detection sensor, in operation, alternately transmits and receives signals through the loop coils by electromagnetic induction,
the placement instruction signal transmission circuit of the writing medium position instruction tool includes a first resonant circuit including a first coil and a first capacitor, and
the position instruction signal transmission circuit of the electronic pen includes a second resonant circuit including a second coil and a second capacitor.

10. The learning support system according to claim 1, wherein:
the handwriting formation unit of the electronic pen is a ballpoint pen unit or a mechanical pencil unit.

11. The learning support system according to claim 1, further comprising:
an eraser function electronic pen including:
an eraser which, in operation, erases the handwriting recorded in the writing medium, and
an erasure position instruction signal transmission circuit which, in operation, transmits an erasure position instruction signal to the position detection apparatus,
wherein the position detection apparatus further includes:
an erasure instruction position detection circuit which, in operation, detects an instruction position of the eraser function electronic pen based on output from the position detection sensor corresponding to the erasure position instruction signal when the eraser function electronic pen is used on the writing medium placed on the position detection sensor,
a second coordinate conversion circuit which, in operation, converts the instruction position of the eraser function electronic pen detected by the erasure instruction position detection circuit into erasure coordinate information in the display device of the display apparatus based on the placement position of the writing medium detected by the placement position detection circuit, and
a third transmission circuit which, in operation, transmits the erasure coordinate information converted by the second coordinate conversion circuit and an erasure instruction to the display apparatus, and
the display apparatus further includes:
a third reception circuit which, in operation, receives the erasure coordinate information and the erasure instruction from the position detection apparatus, and
an erasure control circuit which, in operation, performs a process of erasing handwriting at a position corresponding to the erasure coordinate information on the display device when the erasure coordinate information and the erasure instruction are received through the third reception circuit.

12. The learning support system according to claim 1, wherein:
the position detection sensor of the position detection apparatus is provided on a top plate of a desk.

13. The learning support system according to claim 1, wherein:
the display device of the display apparatus is smaller than a sensor surface of the position detection sensor of the position detection apparatus.

14. The learning support system according to claim 1, wherein:

when there is a plurality of writing medium position instruction tools including placement position instruction signal transmission circuits that transmit placement position instruction signals different from each other, the placement position detection circuit of the position detection apparatus distinguishes and detects a position of each of a plurality of writing mediums provided with different writing medium position instruction tools.

15. The learning support system according to claim 1, wherein:

when there is a plurality of electronic pens including position instruction signal transmission circuits that transmit position instruction signals different from each other, the position detection circuit of the position detection apparatus distinguishes and detects each of the plurality of electronic pens.

16. The learning support system according to claim 1, wherein:

the position detection apparatus further includes:

a fourth transmission circuit which, in operation, transmits the coordinate information converted by the coordinate conversion circuit and user identification information for identifying a user, and the display apparatus is a terminal apparatus that identifies, for the user, input information corresponding to the coordinate information.

* * * * *